United States Patent
Ko et al.

(10) Patent No.: US 9,307,224 B2
(45) Date of Patent: Apr. 5, 2016

(54) GUI PROVIDING METHOD, AND DISPLAY APPARATUS AND 3D IMAGE PROVIDING SYSTEM USING THE SAME

(75) Inventors: Chang-seog Ko, Hwaseong-si (KR); Ji-youn Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 574 days.

(21) Appl. No.: 12/902,243

(22) Filed: Oct. 12, 2010

(65) Prior Publication Data

US 2011/0126159 A1    May 26, 2011

(30) Foreign Application Priority Data

| Nov. 23, 2009 | (KR) | 10-2009-0113234 |
| Nov. 23, 2009 | (KR) | 10-2009-0113238 |
| Nov. 25, 2009 | (KR) | 10-2009-0114596 |
| Dec. 4, 2009  | (KR) | 10-2009-0119891 |

(51) Int. Cl.
*G06F 3/00* (2006.01)
*H04N 13/00* (2006.01)
(Continued)

(52) U.S. Cl.
CPC .......... *H04N 13/004* (2013.01); *G06F 3/04815* (2013.01); *G06F 3/04847* (2013.01); *H04N 5/44504* (2013.01); *H04N 13/007* (2013.01); *H04N 13/0022* (2013.01); *H04N 13/0454* (2013.01); *H04N 13/0456* (2013.01); *H04N 13/0497* (2013.01); *H04N 21/472* (2013.01);
(Continued)

(58) Field of Classification Search
CPC .......... H04N 13/0022; H04N 13/0055; H04N 13/0029; H04N 13/0048; H04N 2013/0081; H04N 13/00; H04N 13/0018; H04N 13/0007; H04N 13/0011; H04N 13/026; H04N 13/0275; H04N 13/0292; H04N 13/0402; H04N 13/0452; H04N 13/0456; H04N 13/0092; H04N 2213/002; H04N 2213/007; G06F 3/048; G06F 3/04815; G06F 3/0482
USPC .................................................. 715/848–852
See application file for complete search history.

(56) References Cited

U.S. PATENT DOCUMENTS

| 6,401,237 B1 | 6/2002 | Ishikawa |
| 7,137,075 B2 | 11/2006 | Hoshino et al. |

(Continued)

FOREIGN PATENT DOCUMENTS

| EP | 0905988 A1 | 3/1999 |
| EP | 0969418 A2 | 1/2000 |

(Continued)

OTHER PUBLICATIONS

Extended European Search Report issued in corresponding European Patent Application No. 10191968.6 on Mar. 28, 2011.
(Continued)

*Primary Examiner* — Kieu Vu
*Assistant Examiner* — Andrew Chung
(74) *Attorney, Agent, or Firm* — Sughrue Mion, PLLC

(57) ABSTRACT

A graphical user interface (GUI) providing method, a display apparatus and a three-dimensional (3D) image providing system using the same are provided. The GUI providing method includes: generating a first GUI for changing settings for a 3D image and a second GUI for changing an environment; and outputting the first GUI and the second GUI. Thus, the settings for the 3D image can be changed more easily and conveniently.

32 Claims, 32 Drawing Sheets

(51) Int. Cl.

| | | |
|---|---|---|
| *G06F 3/0481* | (2013.01) | |
| *G06F 3/0484* | (2013.01) | |
| *H04N 5/445* | (2011.01) | |
| *H04N 13/04* | (2006.01) | |
| *H04N 21/472* | (2011.01) | |
| *H04N 21/485* | (2011.01) | |
| *G06F 3/048* | (2013.01) | |
| *G06F 3/0482* | (2013.01) | |

(52) U.S. Cl.
CPC ............ *H04N 21/4854* (2013.01); *G06F 3/048* (2013.01); *G06F 3/0482* (2013.01)

(56) References Cited

U.S. PATENT DOCUMENTS

| | | | |
|---|---|---|---|
| 7,735,018 B2 | 6/2010 | Bakhash | |
| 7,956,849 B2* | 6/2011 | Anzures et al. | 345/173 |
| 8,023,560 B2 | 9/2011 | Yun et al. | |
| 8,111,906 B2 | 2/2012 | Song et al. | |
| 8,306,387 B2* | 11/2012 | Yamashita et al. | 386/239 |
| 8,487,917 B2 | 7/2013 | Han et al. | |
| 8,674,902 B2 | 3/2014 | Park et al. | |
| 8,860,703 B2 | 10/2014 | Han et al. | |
| 8,881,048 B2 | 11/2014 | Bakhash | |
| 2001/0033327 A1 | 10/2001 | Uomori et al. | |
| 2002/0047835 A1 | 4/2002 | Kawai et al. | |
| 2002/0126202 A1 | 9/2002 | Wood et al. | |
| 2003/0112503 A1* | 6/2003 | Lantin | 359/376 |
| 2004/0027267 A1* | 2/2004 | Rousso | 342/1 |
| 2005/0060666 A1 | 3/2005 | Hoshino et al. | |
| 2007/0003134 A1 | 1/2007 | Song et al. | |
| 2007/0070066 A1 | 3/2007 | Bakhash | |
| 2007/0115276 A1 | 5/2007 | Yun et al. | |
| 2007/0242068 A1 | 10/2007 | Han et al. | |
| 2009/0046097 A1* | 2/2009 | Franklin | 345/419 |
| 2009/0135090 A1 | 5/2009 | Kim | |
| 2009/0142041 A1 | 6/2009 | Nagasawa et al. | |
| 2009/0231353 A1* | 9/2009 | Han | 345/581 |
| 2009/0237327 A1 | 9/2009 | Park et al. | |
| 2010/0074594 A1* | 3/2010 | Nakamura et al. | 386/92 |
| 2010/0085351 A1* | 4/2010 | Deb et al. | 345/419 |
| 2010/0142851 A1* | 6/2010 | Conlon | 382/282 |
| 2010/0142924 A1* | 6/2010 | Yamashita et al. | 386/95 |
| 2011/0010666 A1* | 1/2011 | Choi | 715/810 |
| 2011/0012896 A1* | 1/2011 | Ji | 345/419 |
| 2011/0022988 A1* | 1/2011 | Lee | 715/848 |
| 2011/0025924 A1* | 2/2011 | Price et al. | 348/734 |
| 2011/0029907 A1 | 2/2011 | Bakhash | |
| 2011/0050864 A1* | 3/2011 | Bond | 348/51 |
| 2011/0093890 A1* | 4/2011 | Araki et al. | 725/37 |
| 2011/0216011 A1* | 9/2011 | Cheng et al. | 345/169 |
| 2012/0032954 A1* | 2/2012 | Han et al. | 345/419 |
| 2012/0102435 A1* | 4/2012 | Han et al. | 715/848 |
| 2012/0242808 A1* | 9/2012 | Lee | 348/51 |
| 2013/0286000 A1 | 10/2013 | Han et al. | |
| 2014/0139653 A1 | 5/2014 | Park et al. | |

FOREIGN PATENT DOCUMENTS

| | | |
|---|---|---|
| EP | 1549084 A1 | 6/2005 |
| EP | 1 578 142 A1 | 9/2005 |
| EP | 1617684 A1 | 1/2006 |
| EP | 2326101 A1 | 5/2011 |
| JP | 7-298307 A | 11/1995 |
| JP | 2002092656 A | 3/2002 |
| JP | 2002-189441 A | 7/2002 |
| JP | 2003051029 A | 2/2003 |
| JP | 2004221700 A | 8/2004 |
| JP | 3579162 B2 | 10/2004 |
| JP | 2005110120 A | 4/2005 |
| JP | 2006115151 A | 4/2006 |
| JP | 2007-37619 A | 2/2007 |
| JP | 2009508274 A | 2/2009 |
| JP | 2009-135686 A | 6/2009 |
| KR | 10-2004-0059221 A | 7/2004 |
| KR | 10-2005-0056070 A | 6/2005 |
| KR | 10-2006-0020438 A | 3/2006 |
| KR | 10-2006-0108148 A | 10/2006 |
| KR | 10-0649523 B1 | 11/2006 |
| KR | 100744436 B1 | 8/2007 |
| KR | 10-2007-0102932 A | 10/2007 |
| KR | 1020090054835 A | 6/2009 |
| KR | 10-2009-0101623 A | 9/2009 |
| WO | 9833150 A1 | 7/1998 |
| WO | 0011540 A1 | 3/2000 |
| WO | 02065764 A2 | 8/2002 |

OTHER PUBLICATIONS

Communication dated Mar. 20, 2013, issued by the European Patent Office in counterpart European Application No. 12152352.6.
Communication dated May 8, 2012 issued by the European Patent Office in counterpart European Patent Application No. 12152351.8.
Communication dated May 7, 2012 issued by the European Patent Office in counterpart European Patent Application No. 12152352.6.
Communication dated May 7, 2012 issued by the European Patent Office in counterpart European Patent Application No. 12152347.6.
Lipton, "Stereographics Developers Handbook. Background on Creating images for CrystalEyes and Simuleyes", Jan. 1, 1997, 66 pages total, XP002239311.
Communication, Issued by the European Patent Office, Dated Jul. 29, 2014, In counterpart European Application No. 12152352.6.
Communication, Issued by the European Patent Office, Dated Jul. 21, 2014, In counterpart European Application No. 12152347.6.
Communication dated Oct. 14, 2014, issued by the Japanese Intellectual Property Office in counterpart Japanese Application No. 2010-258854.
Communication issued Jul. 6, 2015, issued by the Japanese Patent Office in counterpart Japanese Patent Application No. 2010-258854.
Communication issued on Oct. 19, 2015 by the Korean Intellectual Property Office in related Application No. 10-2009-0113238.
Communication issued on Oct. 27, 2015 by the Korean Intellectual Property Office in related Application No. 10-2009-0113234.
Communication issued on Nov. 11, 2015 by the Korean Intellectual Property Office in related Application No. 10-2009-0114596.
Communication issued on Nov. 11, 2015 by the Korean Intellectual Property Office in related Application No. 10-2009-0119891.

* cited by examiner

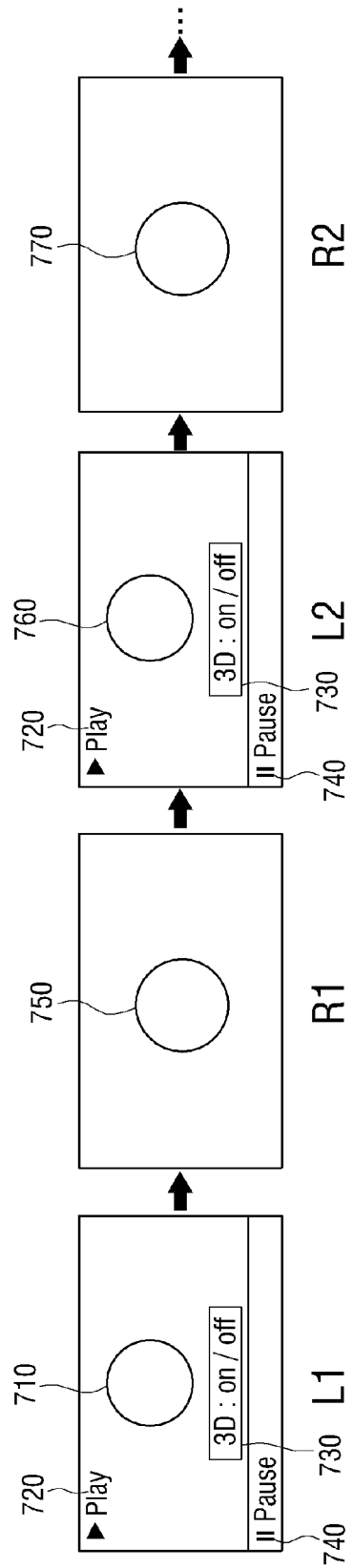

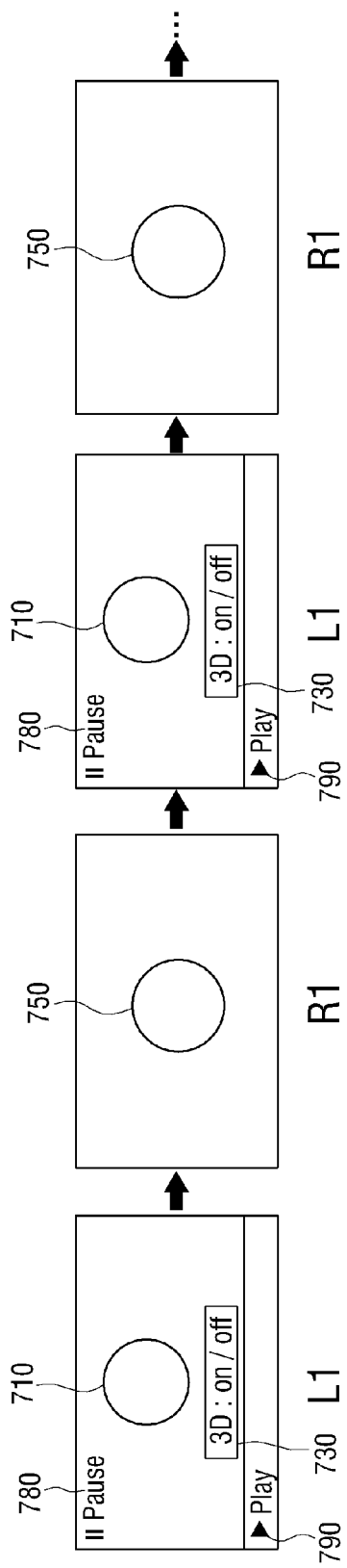

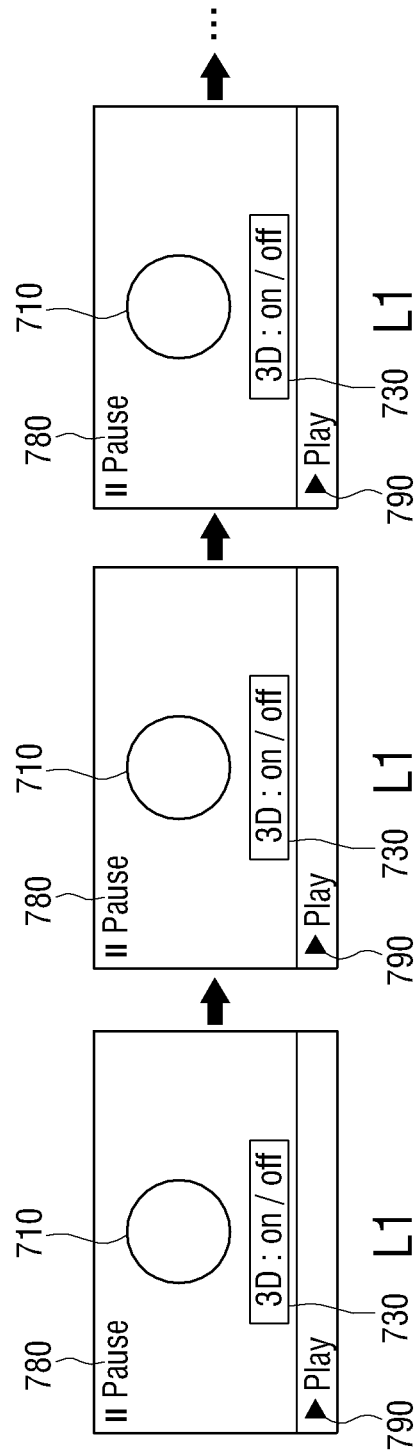

GUI PROVIDING METHOD, AND DISPLAY APPARATUS AND 3D IMAGE PROVIDING SYSTEM USING THE SAME

CROSS-REFERENCE TO RELATED APPLICATIONS

This application claims priority from Korean Patent Application Nos. 2009-113238, filed on Nov. 23, 2009, 2009-113234, filed on Nov. 23, 2009, 2009-114596, filed on Nov. 25, 2009, and 2009-119891, filed on Dec. 4, 2009, in the Korean Intellectual Property Office, the entire disclosures of which are incorporated herein by reference.

BACKGROUND

1. Field

Apparatuses and methods consistent with exemplary embodiments generally relate to a Graphical User Interface (GUI) providing method, and a display apparatus and a three-dimensional (3D) image providing system using the same. More specifically, apparatuses and methods consistent with exemplary embodiments relate to a GUI providing method for changing settings for a 3D image, and a display apparatus and a 3D image providing system using the same.

2. Description of the Related Art

Three-dimensional (3D) stereoscopy is adopted in various fields such as information communication, broadcasting, medical care, educational training, military, gaming, animation, virtual space, computer aided drafting (CAD), and industrial technology. Furthermore, 3D stereoscopy is regarded as a core technology of next-generation 3D stereoscopic multimedia information communication, which is commonly used in various fields.

In general, humans perceive relative depths using thickness variations of lenses based on a location of an object being perceived, an angle difference between both eyes and the object, location and shape differences of the object perceived by two eyes, a time difference according to movement of the object, psychology, and effect from memories.

Among them, binocular disparity resulting from a horizontal separation of about 6~7 cm between two eyes is an important factor in the stereoscopic sense. A person perceives the object with the angle difference because of the binocular disparity such that the two retinal images are different images, and these two images are input to the brain through the retinas. The brain can create the original 3D stereoscopic vision by accurately combining the two images.

Stereoscopic image display apparatuses are categorized into a glass type using special glasses and a non-glass type that does not use special glasses. The glass type includes a color filter scheme which separates and selects the image using complementary color filters, a polarized filter scheme which separates left-eye and right-eye images by restricting light using a combination of orthogonal polarizing elements, and a shutter glass scheme which creates an illusion of a 3D image by alternately blocking the left eye and the right eye in correspondence with a synchronization signal projecting the left-eye image signal and the right-eye image signal on the screen.

The shutter glass scheme, which displays the image using the disparity of two eyes, perceives the relative depths of the image perceived at the different angles in the brain by synchronizing the image presentation of the display apparatus and the on/off state of the left-eye and right-eye lenses of the glasses.

Meanwhile, a user can change various settings for the stereoscopic image to smoothly view the stereoscopic image. However, related art settings for the stereoscopic image are very limited and.

SUMMARY

Exemplary embodiments are provided to address the above-mentioned and other problems and disadvantages occurring in the related art arrangement, and an aspect of an exemplary embodiments provides a graphical user interface (GUI) providing method for allowing a user to change settings for a stereoscopic image more easily, and a display apparatus and a three-dimensional (3D) image providing method using the same.

According to an aspect of an exemplary embodiment, there is provided a GUI providing method including: when a setting command for a 3D image is input, generating a first GUI for changing settings for the 3D image and a second GUI for changing an environment to set the 3D image; and outputting the first GUI and the second GUI.

The environment to set the 3D image may be an environment in which the 3D image is played, or an environment in which the 3D image is paused.

The settings for the 3D image may include at least one of a setting relating to a format of the 3D image, a setting relating to conversion between an output of the 3D image and an output of a 2D image, and a setting relating to at least one of a depth control and a focus control of the 3D image.

When the setting command is input in the environment in which the 3D image is played, the outputting may output the first GUI and the second GUI while maintaining the playback of the 3D image, and when the setting command is input in the environment in which the 3D image is paused, the outputting may output the first GUI and the second GUI while maintaining the pause of the 3D image.

According to an aspect of another exemplary embodiment, there is provided a display apparatus including: a GUI generator which, when a setting command for a 3D image is input, generates a first GUI for changing settings for the 3D image and a second GUI for changing an environment to set the 3D image; and a controller which controls to output the first GUI and the second GUI.

The environment to set the 3D image may be an environment in which the 3D image is played, or an environment in which the 3D image is paused.

The settings for the 3D image may include at least one of a setting relating to a format of the 3D image, a setting relating to conversion between an output of the 3D image and an output of a 2D image, and a setting relating to at least one of a depth control or a focus control of the 3D image.

When the setting command is input in the environment in which the 3D image is played, the controller may control to output the first GUI and the second GUI while maintaining the playback of the 3D image, and when the setting command is input in the environment in which the 3D image is paused, the controller may control to output the first GUI and the second GUI while maintaining the pause of the 3D image.

According to an aspect of another exemplary embodiment, there is provided a 3D image providing system including: a display apparatus which outputs a 3D image and, when a setting command for a 3D image is input, which outputs a first GUI for changing settings for the 3D image and a second GUI for changing an environment to set the 3D image; and shutter glasses which alternately open and close a left-eye glass and a right-eye glass based on a sync signal output from the display apparatus to alternately input a left-eye image and a right-eye image of the 3D image.

According to an aspect of another exemplary embodiment, there is provided a GUI providing method for a 3D image, the method including: when a command for at least one of a focus control and a depth control of the 3D image is input, displaying one GUI for the focus control and the depth control with the 3D image; and changing a left-eye image and a right-eye image of the 3D image according to a manipulation command through the GUI.

The one GUI may be a GUI which overlaps a first control bar for adjusting the focus as moving in a first direction, and a second control bar for adjusting the depth as moving in a second direction.

The manipulation command may be received by using up, down, left and right direction keys of a remote controller, by touching a screen displaying the GUI, or by pointing a screen displaying the GUI from a pointing device.

The up, down, left and right direction keys may respectively correspond to a focus up manipulation command, a focus down manipulation command, a depth up manipulation command, and a depth down manipulation command respectively.

According to an aspect of another exemplary embodiment, there is provided a display apparatus for displaying a 3D image, the display apparatus including: a GUI generator which, when a command for at least one of a focus control and a depth control of the 3D image is input, generates one GUI for the focus control and the depth control; a display which displays the 3D image together with the GUI; and a controller which controls to change a left-eye image and a right-eye image of the 3D image according to a manipulation command through the GUI.

The one GUI may be a GUI which overlaps a first control bar for adjusting the focus as moving in a first direction, and a second control bar for adjusting the depth as moving in a second direction.

The display apparatus may further include a user command receiver which receives the manipulation command.

The manipulation command may be received by using up, down, left and right direction keys of a remote controller, by touching a screen displaying the GUI, or by pointing a screen displaying the GUI from a pointing device.

The up, down, left and right direction keys may respectively correspond to a focus up manipulation command, a focus down manipulation command, a depth up manipulation command, and a depth down manipulation command respectively.

According to an aspect of another exemplary embodiment, there is provided a 3D image providing system including: a display apparatus which, when a command for at least one of a focus control and a depth control of the 3D image is input, displays one GUI for the focus control and the depth control, and which modifies and outputs a left-eye image and a right-eye image of the 3D image according to a manipulation command through the GUI; and shutter glasses which alternately open and close a left-eye glass and a right-eye glass based on a sync signal output from the display apparatus to alternately input the modified left-eye image and the modified right-eye image.

According to an aspect of another exemplary embodiment, there is provided a GUI providing method including: displaying a GUI for setting a third element which combines a first element and a second element to adjust a stereoscopic effect of a 3D image; and modifying a left-eye image and a right-eye image of the 3D image to adjust the stereoscopic effect of the 3D image according to the third element set through the GUI.

The first element for adjusting the stereoscopic effect may be a depth of the 3D image, and the second element for adjusting the stereoscopic effect may be a focus of the 3D image.

The third element may be settable between at least three stages.

The GUI providing method may further include providing a preview of the 3D image with the adjusted stereoscopic effect according to the third element set through the GUI.

According to an aspect of another exemplary embodiment, there is provided a display apparatus including: a GUI generator which generates a GUI to set a third element combining a first element and a second element to adjust a stereoscopic effect of a 3D image; and a controller which controls to modify a left-eye image and a right-eye image of the 3D image to adjust the stereoscopic effect of the 3D image according to the third element set through the GUI.

The first element for adjusting the stereoscopic effect may be a depth of the 3D image, and the second element for adjusting the stereoscopic effect may be a focus of the 3D image.

The GUI may be settable between at least three stages.

The controller may control to provide a preview of the 3D image with the adjusted stereoscopic effect according to the third element set through the GUI.

According to an aspect of another exemplary embodiment, there is provided a display apparatus including: a manipulator which receives a manipulation of a user; an image input part which inputs a 3D image; a 3D image creator which generates a left-eye image and a right-eye image corresponding to the input 3D image; an image output part which alternately outputs the left-eye image and the right-eye image; and a controller which, when a generation command of a 3D GUI to display over the 3D image is input through the manipulator, controls to output only one of the left-eye image and the right-eye image and to output the GUI.

The display apparatus may further include a GUI generator which generates the 3D GUI.

The 3D image creator may generate a left-eye GUI and a right-eye GUI corresponding to the generated 3D GUI, and the controller may control to alternately output the left-eye GUI and the right-eye GUI together with one of the left-eye image and the right-eye image.

When the generation command of the 3D GUI to display over the 3D image is input through the manipulator, the 3D image creator may generate only one of the left-eye image and the right-eye image, and the controller may control to output the only one of the generated left-eye image and the generated right-eye image.

When an end command of the 3D GUI is input through the manipulator, the controller may control to stop outputting the 3D GUI and to alternately output the left-eye image and the right-eye image corresponding to the input 3D image.

According to an aspect of another exemplary embodiment, there is provided a GUI providing method including: receiving a manipulation of a user; inputting a 3D image; generating a left-eye image and a right-eye image corresponding to the input 3D image; alternately outputting the left-eye image and the right-eye image; and when a generation command of a 3D GUI to display over the 3D image is input through the received manipulation, outputting the GUI together with one of the left-eye image and the right-eye image.

The GUI providing method may further include: generating the 3D GUI; generating a left-eye GUI and a right-eye GUI corresponding to the generated 3D GUI; and alternately outputting the left-eye GUI and the right-eye GUI together with one of the left-eye image and the right-eye image.

The generating of the left-eye image and the right-eye image corresponding to the input 3D image may generate only one of the left-eye image and the right-eye image when the generation command of the 3D GUI to display over the 3D image is input through the received manipulation, and the outputting of the only one of the left-eye image and the right-eye image may output one of the generated left-eye image and the generated right-eye image.

The GUI providing method may further include: receiving an end command of the 3D GUI through the manipulator; and stopping an output of the 3D GUI and alternately outputting the left-eye image and the right-eye image corresponding to the input 3D image.

BRIEF DESCRIPTION OF THE DRAWING FIGURES

These and/or other aspects and advantages will become apparent and more readily appreciated from the following description of exemplary embodiments, taken in conjunction with the accompanying drawings of which:

FIGS. 7A, 7B and 7C are diagrams of a method for adding a graphical user interface (GUI) according to an exemplary embodiment;

DETAILED DESCRIPTION OF EXEMPLARY EMBODIMENTS

Exemplary embodiments are described below with reference to the figures. Expressions such as "at least one of," when preceding a list of elements, modify the entire list of elements and do not modify the individual elements of the list. With reference to FIGS. 1 through 4, an operation principle and a structure of a three-dimensional (3D) image providing system according to one or more exemplary embodiments are illustrated. With reference to FIGS. 5A, 5B and 5C, a 3D image processing according to one or more exemplary embodiments is described. A graphical user interface (GUI) providing method for changing settings of a 3D image according to one or more exemplary embodiments is described with reference to FIGS. 6A through 8. A GUI providing method for adjusting depth and focus of a 3D image according to one or more exemplary embodiments is described with reference to FIGS. 9 through 15. A GUI providing method for adjusting a stereoscopic effect of a 3D image according to one or more exemplary embodiments is explained with reference to FIGS. 16 through 19. A 3D GUI providing method according to one or more exemplary embodiments is explained with reference to FIGS. 20 through 23.

<Operation Principle and Structure of a 3D Image Providing System>

Figure 1:
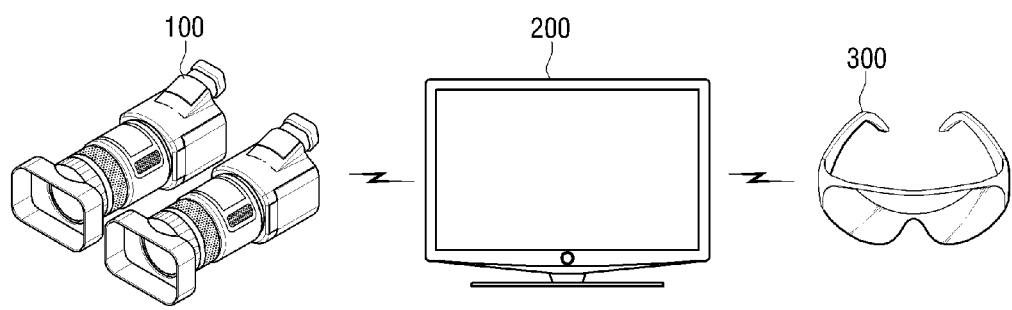
FIG. 1 is a diagram of a 3D image providing system according to an exemplary embodiment.

FIG. 1 depicts a 3D image providing system according to an exemplary embodiment. The 3D image providing system of FIG. 1 includes a camera 100 which generates a 3D image, a TV 200 which displays the 3D image on a screen, and shutter glasses 300 for viewing the 3D image.

The camera 100, which is a kind of a photographing device that generates the 3D image, generates a left-eye image captured to be represented to a left eye of a user and a right-eye image captured to be represented to a right eye of the user. That is, the 3D image includes the left-eye image and the right-eye image. As the left-eye image and the right-eye image are alternately provided to the left eye and the right eye of the user, a stereoscopic effect results due to a binocular disparity.

In particular, the camera 100 includes a left-eye camera or lens which generates the left-eye image and a right-eye camera or lens which generates the right-eye image. An interval between the left-eye camera and the right-eye camera is determined based on a distance between two eyes of the human.

The camera 100 sends the generated left-eye image and the generated right-eye image to the TV 200. The left-eye image and the right-eye image transferred from the camera 100 to the TV 200 are in a format including only one of the left-eye image and the right-eye image in one frame, or in a format including both the left-eye image and the right-eye image in one frame.

Hereafter, the format of the 3D image output to the TV 200 is described in detail with reference to FIGS. 2A through 2F.

FIGS. 2A through 2F are diagrams of 3D image formats. In FIGS. 2A through 2F, the left-eye image part is colored white and the right-eye image part is colored black to ease an understanding thereof.

Figure 2A:
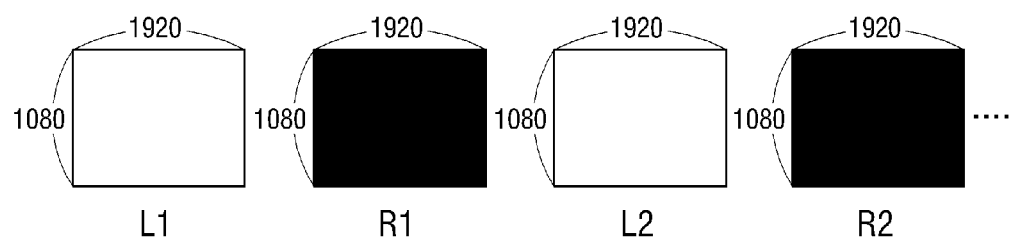
FIGS. 2A through 2F are diagrams of 3D image formats.

FIG. 2A depicts a 3D image format according to a frame sequence scheme. According to the frame sequence scheme, the 3D image format inserts one left-eye image or one right-eye image into one frame.

In this format, a 3D image of a 1920*1080 resolution may be constructed, for example, in a sequence of: "a frame including the left-eye image L1 filmed by the left-eye camera -> a frame including the right-eye image R1 filmed by the right-eye camera -> a frame including the left-eye image L2 filmed by the left-eye camera -> a frame including the right-eye image R2 filmed by the right-eye camera -> . . . ".

Figure 2B:
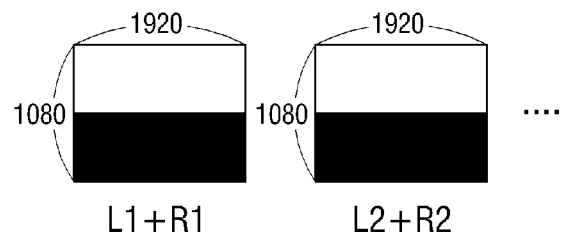

FIG. 2B depicts a 3D image format according to a top-bottom scheme. The top-bottom scheme is also called a vertical division scheme. The 3D image format of this scheme includes both of the left-eye image and the right-eye image in one frame. In the 3D image format based on the top-bottom scheme, the left-eye image and the right-eye image are divided vertically, the left-eye image lies in an upper side, and the right-eye image lies in a lower side.

For example, the left-eye image and the right-eye image captured by the camera 100 are downscaled vertically and respectively converted into a 1920*540 resolution. Next, the downscaled right-eye and left-eye images are vertically united as a single frame in the 1920*1080 resolution and then transferred to the TV 200.

In this format, the 3D image of the 1920*1080 resolution may be constructed, for example, in a sequence of "a frame including the left-eye image L1 (upper) filmed by the left-eye camera and the right-eye image R1 (lower) filmed by the right-eye camera ->a frame including the left-eye image L2 (upper) filmed by the left-eye camera and the right-eye image R2 (lower) filmed by the right-eye camera -22 . . . ".

Figure 2C:
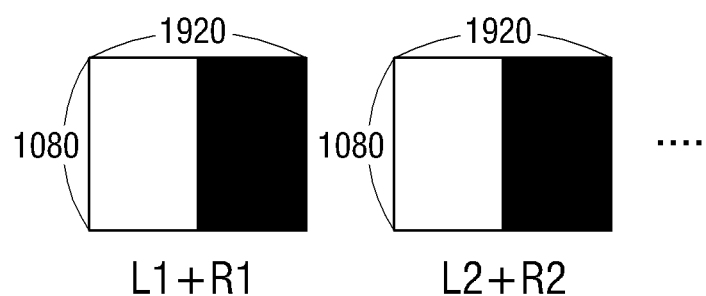

FIG. 2C depicts a 3D image format according to a side-by-side scheme. Based on the side-by-side scheme, the 3D image format includes both of the left-eye image and the right-eye image in one frame. In the 3D image format of the side-by-side scheme, the left-eye image and the right-eye image are divided horizontally, the left-eye image lies in a left side, and the right-eye image lies in a right side.

For example, the left-eye image and the right-eye image captured by the camera 100 are downscaled horizontally and respectively converted to a 960*1080 resolution. Next, the downscaled left-eye and right-eye images are horizontally united as a single frame of the 1920*1080 resolution and then transmitted to the TV 200.

In this format, the 3D image of the 1920*1080 resolution may be constructed, for example, in a sequence of "a frame including the left-eye image L1 (left) filmed by the left-eye camera and the right-eye image R1 (right) filmed by the right-eye camera ->a frame including the left-eye image L2 (left) filmed by the left-eye camera and the right-eye image R2 (right) filmed by the right-eye camera -> . . . ".

Figure 2D:
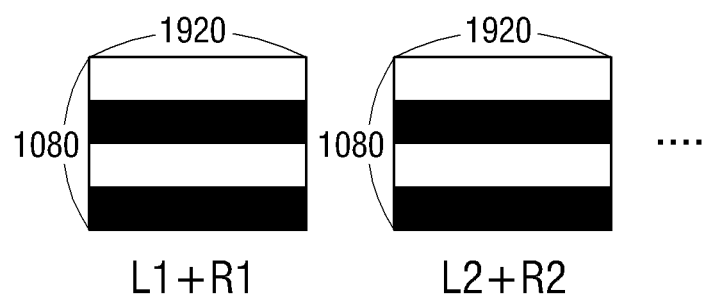

FIG. 2D depicts a 3D image format according to a horizontal interleave scheme. According to the horizontal interleave scheme, the 3D image format includes both of the left-eye image and the right-eye image in one frame. In the 3D image format of the horizontal interleave scheme, the left-eye image and the right-eye image are alternated on a row basis.

For example, the left-eye image and the right-eye image captured by the camera 100 can be included in one frame according to a first method by downscaling in the vertical direction, respectively converting to a 1920*540 resolution, and alternating the converted left-eye image and the converted right-eye image in the odd rows or in the even rows on the row basis, or according to a second method by extracting only odd-row images from the left-eye image, extracting only even-row images from the right-eye image, and uniting the odd-row images and the even-row images.

For example, the 3D image of the format according to the first method is included in one frame in a sequence of "the first row of the left-eye image (L1) filmed by the left-eye camera, the first row of the right-eye image (R1) filmed by the right-eye camera, the second row of the left-eye image (L1) filmed by the left-eye camera, the second row of the right-eye image (R1) filmed by the right-eye camera, . . . ".

The next frame has, for example, a sequence of "the first row of the left-eye image (L2) filmed by the left-eye camera, the first row of the right-eye image (R2) filmed by the right-eye camera, the second row of the left-eye image (L2) filmed by the left-eye camera, the second row of the right-eye image (R2) filmed by the right-eye camera, . . . ".

Figure 2E:
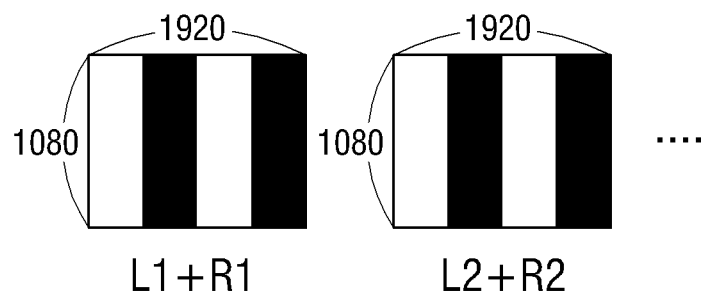

FIG. 2E depicts a 3D image format according to a vertical interleave scheme. According to the vertical interleave scheme, the 3D image format includes both of the left-eye image and the right-eye image in one frame. In the 3D image format of the vertical interleave scheme, the left-eye image and the right-eye image are alternated on a column basis.

For example, the left-eye image and the right-eye image captured by the camera 100 can be included in one frame according to a first method by downscaling in the horizontal direction, respectively converting to a 960*1080 resolution, and alternating the converted right-eye image and the converted right-eye image in the odd columns or in the even columns on the column basis, or according to a second method by extracting only odd-column images from the left-eye image, extracting only even-column images from the right-eye image, and uniting the odd-column images and the even-column images.

For example, the 3D image of the format according to the first method is included in one frame in a sequence of "the first column of the left-eye image (L1) filmed by the left-eye camera, the first column of the right-eye image (R1) filmed by the right-eye camera, the second column of the left-eye image (L1) filmed by the left-eye camera, the second column of the right-eye image (R1) filmed by the right-eye camera, . . . ".

The next frame has, for example, with a sequence of "the first column of the left-eye image (L2) filmed by the left-eye camera, the first column of the right-eye image (R2) filmed by the right-eye camera, the second column of the left-eye image (L2) filmed by the left-eye camera, the second column of the right-eye image (R2) filmed by the right-eye camera, . . . ".

Figure 2F:
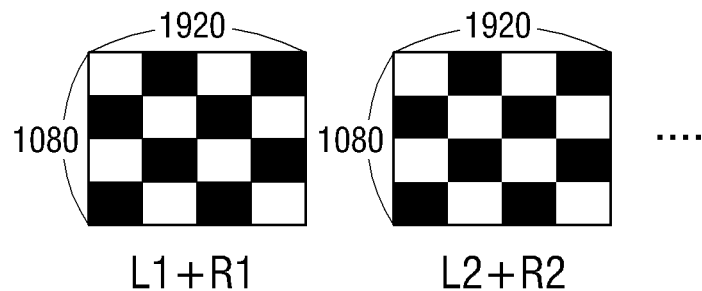

FIG. 2F depicts a 3D image format according to a checkerboard scheme. According to the checkerboard scheme, the 3D image format includes both of the left-eye image and the right-eye image in one frame. The 3D image format based on the checkerboard scheme alternates the left-eye image and the right-eye image on a pixel basis or on a pixel group basis.

For example, the left-eye image and the right-eye image captured by the camera 100 are extracted on the pixel basis or on the pixel group basis and alternated in pixels or pixel groups of the frame.

For example, the 3D image format based on the checkerboard scheme is included in one frame in a sequence of "the first row and the first column of the left-eye image (L1) filmed by the left-eye camera, the first row and the second column of the right-eye image (R1) filmed by the right-eye camera, the first row and the third column of the left-eye image (L1) filmed by the left-eye camera, the first row and the fourth column of the right-eye image (R1) filmed by the right-eye camera, . . . ".

The next frame has, for example, a sequence of "the first row and the first column of the left-eye image (L2) filmed by the left-eye camera, the first row and the second column of the right-eye image (R2) filmed by the right-eye camera, the first row and the third column of the left-eye image (L2) filmed by the left-eye camera, the first row and the fourth column of the right-eye image (R2) filmed by the right-eye camera, . . . ".

Referring back to FIG. 1, the camera 100 operates according to a 3D image format (for example, one of the above-described formats), generates the 3D image in the 3D image format, and sends the generated 3D image to the TV 200.

The TV 200, which is a display apparatus, receives the 3D image from a photographing device (such the camera 100 or the 3D image which is filmed by the camera 100, edited and processed at a broadcasting station, and transmitted from the broadcasting station), processes the received 3D image, and displays the processed 3D image on a screen. The TV 200 processes the left-eye image and the right-eye image according to the 3D image format, and time-divides and alternately displays the processed left-eye image and right-eye image.

Furthermore, the TV 200 generates a sync signal synchronized with the timing of time-dividing and the displaying of the left-eye image and the right-eye image, and sends the sync signal to the shutter glasses 300. It is understood that according to another exemplary embodiment, a processing device other than the TV 200 may perform at least one of receiving the 3D image, processing the 3D image, displaying the 3D image, and generating and sending a sync signal to the shutter. For example, the processing device other than the TV 200 may be a general-purpose computer, a special-purpose computer, a set-top box, a standalone device, a laptop computer, a mobile device, etc.

Figure 3:
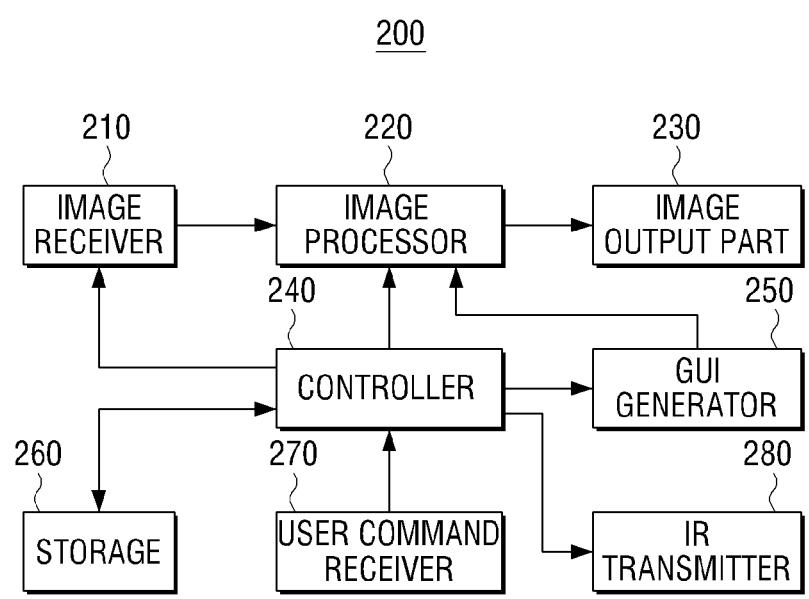
FIG. 3 is a block diagram of a television (TV) according to an exemplary embodiment.

A detailed structure of the TV 200 is described with reference to FIG. 3. FIG. 3 is a block diagram of a TV 200 according to an exemplary embodiment.

The TV 200 includes an image receiver 210, an image processor 220, an image output part 230, a controller 240, a GUI generator 250, a storage 260, a user command receiver 270, and an infrared (IR) transmitter 280.

The image receiver 210 receives and demodulates a broadcast from a broadcasting station or a satellite by cable or by radio. The image receiver 210 is connected to an external device such as camera 100 to receive the 3D image from the external device. The external device can be connected wirelessly or by wire through an interface such as S-Video, Component, Composite, D-Sub, DVI, and HDMI.

As stated above, the 3D image includes at least one frame, and one image frame includes both of the left-eye image and the right-eye image or each individual frame includes the left-eye image or the right-eye image. For example, the 3D image is generated according to one of the formats described above with reference to FIGS. 2A to 2F.

Accordingly, the 3D image received at the image receiver 210 can vary. In particular, the format can conform to one of the general frame sequence scheme, the top-bottom scheme, the side-by-side scheme, the horizontal interleave scheme, the vertical interleave scheme, and the checkerboard scheme.

The image receiver 210 forwards the received 3D image to the image processor 220.

The image processor 220 applies signal processing such as video decoding, format analyzing, and video scaling, and adds the GUI to the 3D image received from the image receiver 210.

The image processor 220 generates a left-eye image and a right-eye image corresponding to a screen size (for example, 1920*1080) using the format of the 3D image input from the image receiver 210.

When the 3D image format conforms to the top-bottom scheme, the side-by-side scheme, the horizontal interleave scheme, the vertical interleave scheme, or the checkerboard scheme, the image processor 220 extracts the left-eye image part and the right-eye image part from each image frame, upscales or interpolates the extracted left-eye image and right-eye image, and generates the left-eye image and the right-eye image accordingly to display to a user.

When the 3D image format conforms to the general frame sequence scheme, the image processor 220 extracts the left-eye image or the right-eye image from each frame and prepares the respective images to be displayed to the user.

Meanwhile, information relating to the format of the input 3D image may or may not be included in the 3D image signal.

For example, when the format information of the input 3D image is included in the 3D image signal, the image processor 220 extracts the format information by analyzing the 3D image and processes the received 3D image according to the extracted information. Conversely, when the format information of the input 3D image is not included in the 3D image signal, the image processor 220 processes the received 3D image according to the format input from the user or according to a preset format.

The image processor 220 adds the GUI output from the GUI generator 250, to be described below, to at least one of the left-eye image and the right-eye image.

The image processor 220 time-divides the extracted left-eye image and right-eye image and alternately sends the time-divided images to the image output part 230. For example, the image processor 220 outputs the left-eye image and the right-eye image to the image output part 230 in a temporal order of "the left-eye image (L1)->the right-eye image (R1)->the left-eye image (L2)->the right-eye image (R2)-> . . . ".

The image output part 230 alternately displays the left-eye image and the right-eye image output from the image processor 220, to the user.

The GUI generator 250 generates the GUI to display on a display. The GUI generated by the GUI generator 250 is applied to the image processor 220 and added to at least one of the left-eye image and the right-eye image to be displayed by the display.

The storage 260 is a storing medium for storing various programs used to operate the TV 200. The storage 260 may be external or internal, and may be a volatile memory (such as RAM) or a non-volatile memory (such as ROM, flash memory, or a hard disk drive).

The user command receiver 270 forwards a user command received from an input device or method such as remote controller, to the controller 240.

The IR transmitter 280 generates the sync signal synchronized with the alternately output left-eye image and right-eye image, and sends the generated sync signal to the shutter glasses 300 as an IR signal. Based on the synchronization between the TV 200 and the shutter glasses 300, as the shutter glasses 300 are opened and closed alternately, the left-eye image is displayed in the image output part 230 at the left-eye open timing of the shutter glasses 300 and the right-eye image is displayed in the image output part 230 at the right-eye open timing of the shutter glasses 300.

The controller 240 controls the operations of the TV 200 according to the user command fed from the user command receiver 270.

The controller 240 controls the image receiver 210 and the image processor 220 to receive the 3D image, to split the received 3D image into the left-eye image and the right-eye image, and to scale or interpolate the divided left-eye image and right-eye image in size to be respectively displayed on a full screen.

The controller 240 controls the GUI generator 250 to generate the GUI corresponding to the user command fed from the user command receiver 270, and controls the IR transmitter 280 to generate and send the sync signal synchronized with the output timings of the left-eye image and the right-eye image.

The shutter glasses 300 alternately open and close the left-eye glass and the right-eye glass according to the sync signal received from the TV 200 so that the user can view the left-eye image and the right-eye image through the left eye and the right eye, respectively. Hereafter, a structure of the shutter glasses 300 is provided in detail with reference to FIG. 4.

Figure 4:
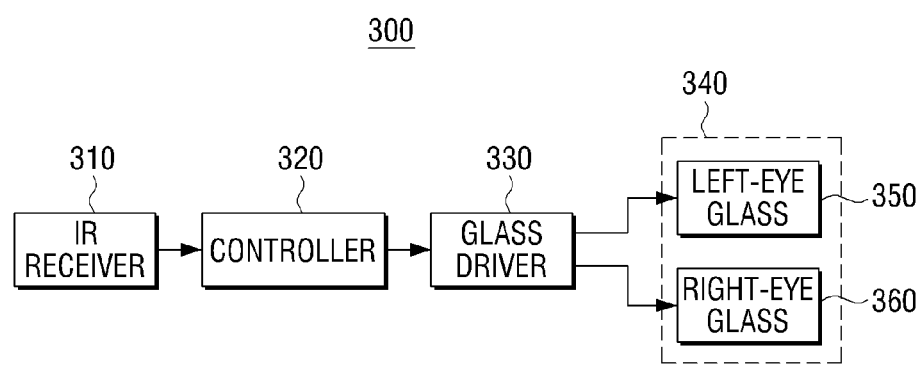
FIG. 4 is a block diagram of shutter glasses according to an exemplary embodiment.
Figure 5A:
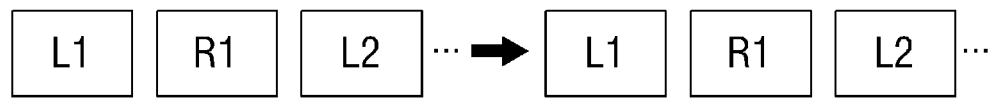
FIGS. 5A, 5B and 5C are diagrams of a processing method based on a 3D image format according to exemplary embodiments.
Figure 5B:
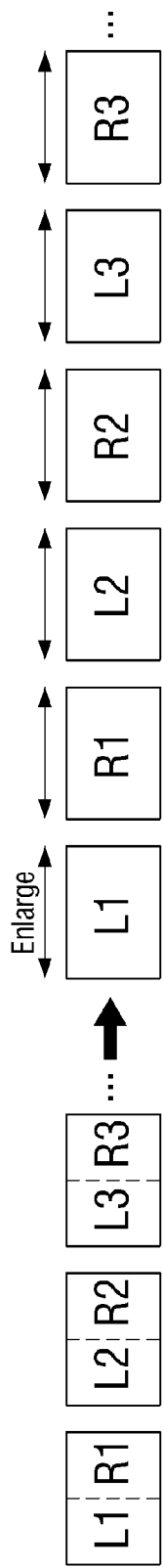
Figure 5C:
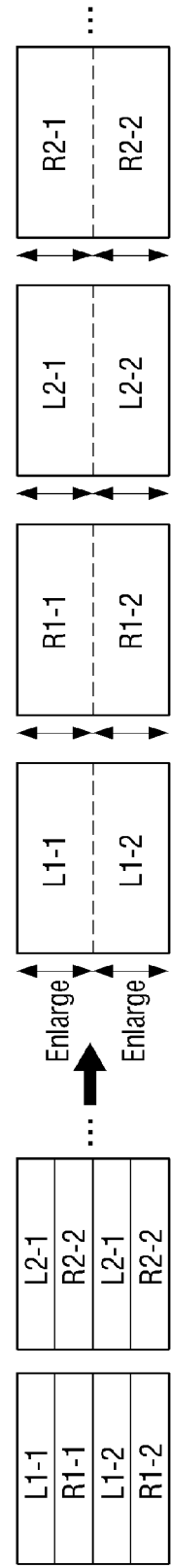

FIG. 4 is a block diagram of shutter glasses 300 according to an exemplary embodiment. The shutter glasses 300 include an IR receiver 310, a controller 320, a glass driver 330, and a glass part 340.

The IR receiver 310 receives the sync signal for the 3D image from the IR transmitter 280 of the TV 200 connected by wire or wirelessly. The IR transmitter 280 emits the sync signal using a straight infrared ray, and the IR receiver 310 receives the sync signal from the emitted infrared ray.

For example, the sync signal emitted by the IR transmitter 280 to the IR receiver 310 can be a signal which alternates a high level and a low level at preset time intervals where the left-eye image is transmitted at the high level, and the right-eye image is transmitted at the low level.

The IR receiver 310 forwards the sync signal received from the IR transmitter 280 to the controller 320.

The controller 320 controls the operations of the shutter glasses 300. The controller 320 generates a control signal based on the sync signal received at the IR receiver 310 and sends the generated control signal to the glass driver 330 to control the glass driver 330. Based on the sync signal, the controller 320 controls the glass driver 330 to generate a driving signal for driving the glass part 340.

The glass driver 330 generates the driving signal based on the control signal received from the controller 320. Since the glass part 340 includes a left-eye glass 350 and a right-eye glass 360, to be described below, the glass driver 330 generates the left-eye driving signal for driving the left-eye glass 350 and the right-eye driving signal for driving the right-eye glass 360, sends the generated left-eye driving signal to the left-eye glass 350, and sends the generated right-eye driving signal to the right-eye glass 360.

The glass part 340 includes the left-eye glass 350 and the right-eye glass 360 as stated above, and opens and closes the glasses according to the driving signal received from the glass driver 330.

<Processing and Screen Configuration for the 3D Image>

Hereafter, a 3D image processing according to one or more exemplary embodiments is explained with reference to FIGS. 5A, 5B and 5C. FIGS. 5A, 5B and 5C are diagrams of processing methods according to one or more exemplary embodiments based on a 3D image format.

FIG. 5A depicts a method for displaying the 3D image received according to the general frame sequence scheme.

As shown in FIG. 5A, the 3D image format according to the frame sequence scheme inserts one left-eye image or one right-eye image into one frame. Hence, the 3D image may be, for example, input in a sequence of "the frame including the left-eye image L1 filmed by the left-eye camera->the frame including the right-eye image R1 filmed by the right-eye camera->the frame including the left-eye image L2 filmed by the left-eye camera->the frame including the right-eye image R2 filmed by the right-eye camera-> . . . ". Furthermore, the images may be displayed on the screen in the input order.

FIG. 5B depicts a method for displaying the 3D image received in the side-by-side scheme.

The 3D image format according to the side-by-side scheme includes both of the left-eye image and the right-eye image in one frame. In the 3D image format of the side-by-side scheme, the left-eye image and the right-eye image are divided horizontally, the left-eye image lies in the left side, and the right-eye image lies in the right side.

According to this format, the TV 200 divides to the left-eye image part and the right-eye image part by horizontally bisecting each frame of the received 3D image, horizontally upscales the divided left-eye image and right-eye image parts two times, generates the left-eye image and the right-eye image to display on a screen, and alternately displays the generated left-eye and right-eye images on the screen.

For example, the 3D image is displayed on the screen in a sequence of "the twice enlarged left-eye image of the left part (L1) of the image in the first frame->the twice enlarged right-eye image of the right part (R1) of the image in the first frame->the twice enlarged left-eye image of the left part (L2) of the image in the second frame->the twice enlarged right-eye image of the right part (R2) of the image in the second frame-> . . . ".

While the method for processing the 3D image format according to the side-by-side scheme has been described, the processing of the 3D image format according to the top-bottom scheme may be inferred therefrom. In detail, as for the 3D image format of the top-bottom scheme, the TV 200 divides to the left-eye image part and the right-eye image part by vertically bisecting each frame of the received 3D image, generates the left-eye image and the right-eye image to display in the screen by vertically upscaling the divided left-eye and right-eye image parts two times, and alternately displays the generated left-eye image and right-eye image in the screen.

FIG. 5C depicts a method for displaying the 3D image received according to the horizontal interleave scheme, on the screen.

The 3D image format of the horizontal interleave scheme includes both of the left-eye image and the right-eye image in one frame. In the 3D image format of the horizontal interleave scheme, the left-eye image and the right-eye image are alternated on a row basis.

In this format, the TV 200 splits to the left-eye image part and the right-eye image part by dividing each frame of the received 3D image based on odd rows and even rows, generates the left-eye image and the right-eye image by vertically upscaling the split left-eye image and right-eye image parts two times, and alternately displays the generated left-eye image and right-eye image on the screen.

For example, the 3D image is displayed on a screen in a sequence of "the twice enlarged left-eye image of the odd-row parts (L1-1 and L1-2) of the image in the first frame→the twice enlarged right-eye image of the right parts (R1-1 and R1-2) of the image in the first frame->the twice enlarged left-eye image of the left parts (L2-1 and L2-2) of the image in the second frame->the twice enlarged right-eye image of the right parts (R2-1 and R2-2) of the image in the second frame-> . . . ".

As for the 3D image format according to the horizontal interleave scheme, the left-eye image may be generated by interpolating the even rows using the odd rows of the image in one frame and the left-eye image may be generated by interpolating the odd rows using the even rows, without upscaling.

Without upscaling or interpolating, the left-eye image can be generated by outputting the image only for the odd rows and the right-eye image can be generated by outputting the image for the even rows.

While the processing on the 3D image format of the horizontal interleave scheme has been described, the processing on the 3D image format of the vertical interleave scheme or the checkerboard scheme may be inferred therefrom.

That is, in the 3D image format of the vertical interleave scheme, the left-eye image and the right-eye image can be generated by applying column based scaling or interpolating, rather than the row based scaling or interpolating, to thus display the 3D image to the user.

The 3D image format of the checkerboard scheme can implement the scaling or the interpolating based on a pixel, or the scaling or the interpolating based on a pixel group.

<GUI Providing Method for Changing Settings of the 3D Image>

Referring to FIGS. 6A through 6D, a screen configuration when a 3D image setting change command is input while a user is watching a processed 3D image according to one or more exemplary embodiments will now be described.

in the one or more exemplary embodiments illustrated in FIGS. 6A through 6D, the left-eye image and the right-eye image of the 3D image may be time-divided and alternately output as described above. For the graphical representation of the 3D image, a 3D object 610 overlaps a circular left-eye image and a circular right-eye image in FIGS. 6A through 6D.

Figure 6A:
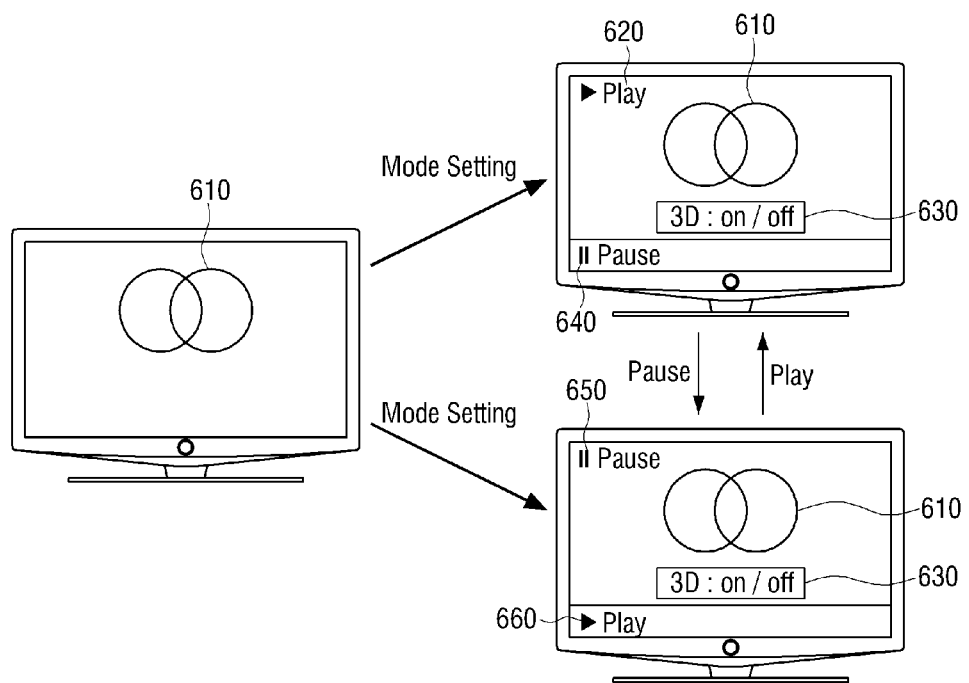
FIGS. 6A through 6D are diagrams of screens for changing settings according to exemplary embodiments.

FIG. 6A shows a screen configuration when settings for a 3D image mode are changed according to an exemplary embodiment. When a command instructing to change the mode setting is input from the user while the 3D image is displayed on the screen as shown in the left of FIG. 6A, the screen is changed to a screen for changing the mode setting as shown in the upper right side or the lower right side of FIG. 6A.

The mode setting indicates an ON/OFF setting for the 3D image.

When the ON state of the 3D image is set, the format of the input image is analyzed, the left-eye image and the right-eye image are divided based on the analyzed format, and the divided left-eye image and the right-eye image are time-divided and alternately displayed.

For example, when the 3D image is formatted in the side-by-side scheme and the ON state of the 3D image is set, the TV 200 extracts the left-eye image part and the right-eye image part from one frame, horizontally upscales the extracted left-eye and right-eye image parts, and alternately displays the upscaled left-eye image and right-eye image.

By contrast, when the OFF state is set for the 3D image, the TV 200 displays the image as is according to the format of the input image.

For example, when the 3D image is formatted in the side-by-side scheme and the OFF state of the 3D image is set, the TV 200 displays the 3D image by representing the left-eye image in the left and the right-eye image in the right according to the format of the 3D image of the side-by-side scheme.

Meanwhile, the upper right screen illustrated in FIG. 6A is to change the mode during a playback of the 3D image, as indicated by a "▸ Play" icon 620. The lower right screen illustrated in FIG. 6A is to change the mode during pause of the 3D image, as indicated by a "//Pause" icon 650.

When the user inputs a command instructing to change the mode, the screen for changing the mode setting during the playback or during the pause is displayed according to a preset scheme.

In the screen for changing the mode setting, a GUI 630 for the mode setting change and a GUI 640 for changing the playback to the pause or a GUI 660 for changing the pause to the playback are displayed together. In other words, during the playback, the GUI 630 for the mode setting change and the GUI 640 for changing the playback to the pause are displayed together. During the pause, the GUI 630 for the mode setting change and the GUI 660 for changing the pause to the playback are displayed together.

Hence, the user can change the mode setting from the 3D ON to the 3D OFF or from the 3D OFF to the 3D ON by manipulating the GUI 630 for the mode setting change. Furthermore, the user can change an environment for the mode setting change from the playback to the pause or from the pause to the playback by manipulating the environment related GUIs 640 and 660.

Due to the characteristics of the 3D image, the playback or the pause can be further facilitated depending on the setting type of the 3D image. Thus, by providing the GUI 640 or 660 for changing the environment for the mode setting change when the mode setting change command is input, the user can change the mode setting more easily.

Figure 6B:
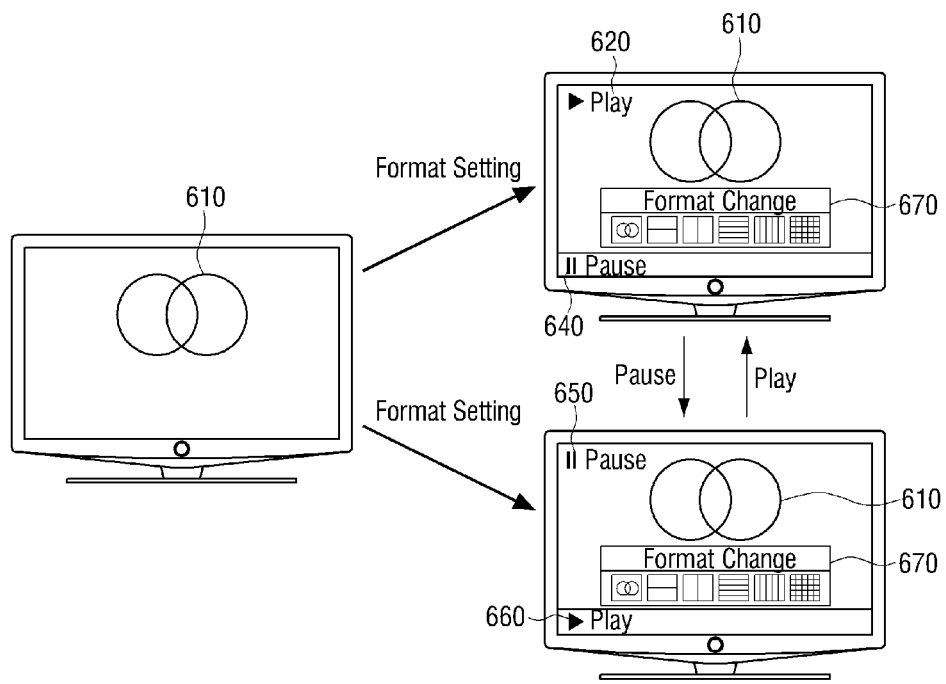

Next, FIG. 6B shows a screen configuration when a setting for a 3D image format is changed. When the user inputs a command for changing the format setting while the 3D image is displayed in the screen as shown in the left side of FIG. 6B, the screen is changed to a screen for changing the format setting as shown in the upper right side or the lower right side of FIG. 6B.

The format setting designates the format according to, for example, the frame sequence scheme, the top-bottom scheme, the side-by-side scheme, the horizontal interleave scheme, the vertical interleave scheme, or the checkerboard scheme, as described above.

When the user selects one of those formats for the 3D image, the received 3D image is divided into the left-eye image and the right-eye image in the input image frame according to the format selected by the user, regardless of the actual format of the input image, and the divided left-eye image and right-image are time-divided and alternately displayed. In another exemplary embodiment, the format may be automatically detected by the TV 200 or set by default.

For example, when the input 3D image is formatted in the side-by-side scheme and the user inputs the command instructing to change to the format of the top-bottom scheme, the TV 200 divides the image of one image frame into the upper image and the lower image, vertically upscales the divided images two times, and then outputs the left-eye image and the right-eye image respectively.

As a result, the left-eye image output on the screen includes the upper part of the left-eye image and the upper part of the right-eye image captured by the camera 100, and the right-eye image output on the screen includes the lower part of the left-eye image and the lower part of the right-eye image captured by the camera 100.

In a case where the 3D image is output in an inappropriate format because of a mechanical malfunction, an unnatural or imperceptible image is provided to the user. Thus, such a format setting allows the user to select the format manually so as to watch a natural 3D image.

Meanwhile, the upper right screen illustrated in FIG. 6B is to change the format during a playback of the 3D image, as indicated by the "▸ Play" icon 620. The lower right screen illustrated in FIG. 6B is to change the format during a pause of the 3D image, as indicated by the "//Pause" icon 650.

When the user inputs the command instructing to change the format setting, the screen for changing the format setting during the playback or during the pause is displayed according to a preset scheme.

In the screen for changing the format setting, a GUI 670 for the format setting change and the GUI 640 for changing the playback to the pause or the GUI 660 for changing the pause to the playback are displayed together. In other words, during the playback, the GUI 670 for the format setting change and the GUI 640 for changing the playback to the pause are displayed together. During the pause, the GUI 670 for the format setting change and the GUI 660 for changing the pause to the playback are displayed together.

The GUI 670 relating to the format setting represents, from the left, the format based on the frame sequence scheme, the format based on the top-bottom scheme, the format based on the side-by-side scheme, the format based on the horizontal interleave scheme, the format based on the vertical interleave scheme, and the format based on the checkerboard scheme, though it is understood that this arrangement is merely exemplary, and another exemplary embodiment is not limited thereto.

Hence, the user can change the format by manipulating the GUI 670 relating to the format setting change. Furthermore, the user can change the environment for the format setting change from the playback to the pause or from the pause to the playback by manipulating the environment related GUIs 640 and 660.

Figure 6C:
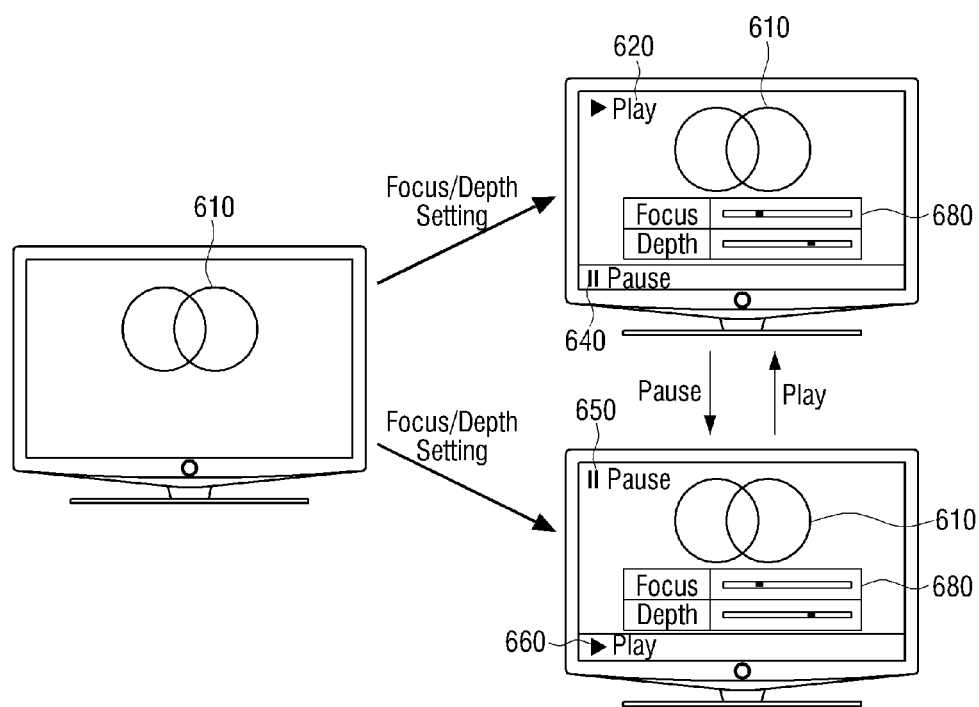

FIG. 6C shows a screen configuration when settings for a focus/depth of a 3D image are changed according to an exemplary embodiment. When the user inputs a command for changing the focus/depth setting while the 3D image is displayed on the screen as shown in the left side of FIG. 6C, the screen is changed to a screen for changing the focus/depth setting as shown in the upper right side or in the lower right side of FIG. 6C.

The focus setting is to increase or decrease the vividness of 3D objects displayed on the screen, and the depth setting is to increase or decrease the stereoscopic effect of the 3D objects displayed on the screen.

In a case where the 3D image is output with the inappropriate focus/depth because of a mechanical malfunction, an unnatural or imperceptible image is provided to the user. Thus, such focus/depth setting allows the user to select the focus/depth manually so as to watch a natural 3D image.

Meanwhile, the upper right screen illustrated in FIG. 6C is to change the focus/depth during a playback of the 3D image, as indicated by the "▶ Play" icon 620. The lower right screen illustrated in FIG. 6C is to change the focus/depth setting during a pause of the 3D image, as indicated by the "//Pause" icon 650.

When the user inputs a command instructing to change the focus/depth setting, the screen for changing the focus/depth setting during the playback or during the pause is displayed according to a preset scheme.

The screen for changing the focus/depth setting displays a GUI 680 relating to the focus/depth setting change and the GUI 640 for changing the playback to the pause or the GUI 660 for changing the pause to the playback together. In other words, during the playback, the GUI 680 for the focus/depth setting change and the GUI 640 for changing the playback to the pause are displayed together. During the pause, the GUI 680 for the focus/depth setting change and the GUI 660 for changing the pause to the playback are displayed together.

Hence, the user can change the focus/depth by manipulating the GUI 680 relating to the focus/depth setting change. Furthermore, the user change the environment for the focus/depth setting change from the playback to the pause or from the pause to the playback by manipulating the environment related GUIs 640 and 660.

Figure 6D:
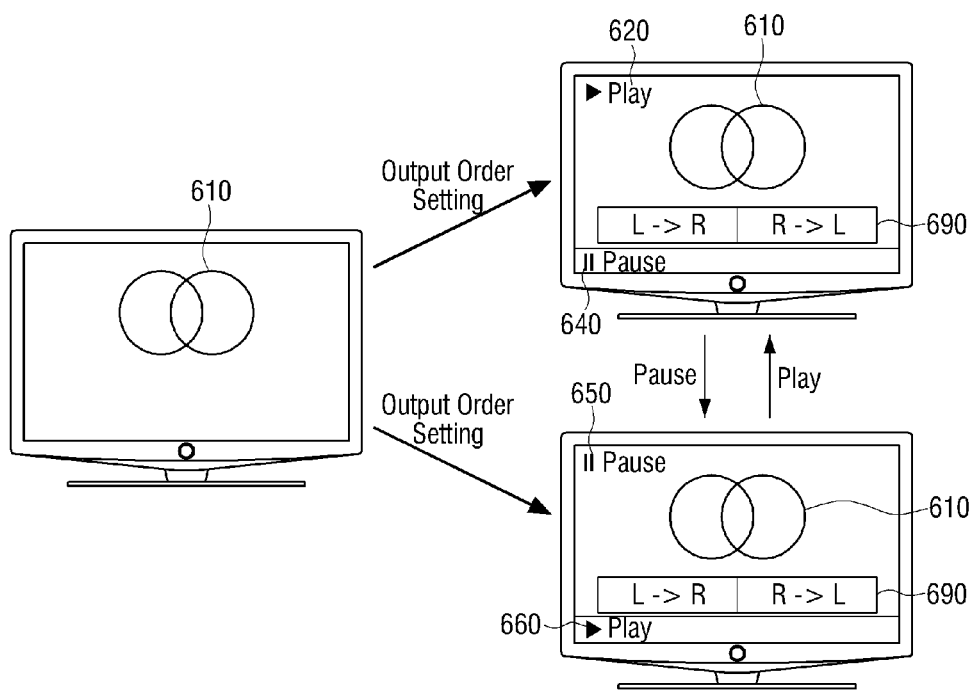

FIG. 6D shows a screen configuration when a setting for an output order of a 3D image is changed according to an exemplary embodiment. When the user inputs a command for changing the output order setting while the 3D image is displayed on the screen as shown in the left side of FIG. 6D, the screen is changed to a screen for changing the output order setting as shown in the upper right side or the lower right side of FIG. 6D.

The output order setting defines whether to time-divide and alternately output in a sequence of the left-eye image->the right-eye image or in a sequence of the right-eye image->the left-eye image after extracting the left-eye image part and the right-eye image part from one frame and upscaling the extracted left-eye image part and right-eye image part.

In a case where the 3D image is output in an inappropriate output order because of a mechanical malfunction, an unnatural or imperceptible image is provided to the user. Thus, such an output order setting allows the user to select the output order manually so as to watch a natural 3D image.

Meanwhile, the upper right screen illustrated in FIG. 6D is to change the output order during a playback of the 3D image, as indicated by the "▶ Play" icon 620. The lower right screen illustrated in FIG. 6D is to change the output order setting during a pause of the 3D image, as indicated by the "//Pause" icon 650.

When the user inputs a command instructing to change the output order setting, the screen for changing the output order setting during the playback or during the pause is displayed according to a preset scheme.

The screen for changing the output order setting displays a GUI 690 relating to the output order setting change together with the GUI 640 for changing the playback to the pause or the GUI 660 for changing the pause to the playback. In other words, during the playback, the GUI 690 for the output order setting change and the GUI 640 for changing the playback to the pause are displayed together. During the pause, the GUI 690 for the output order setting change and the GUI 660 for changing the pause to the playback are displayed together.

Hence, the user can change the output order by manipulating the GUI 690 relating to the output order setting change. Furthermore, the user can change the environment for the output order setting change from the playback to the pause or from the pause to the playback by manipulating the environment related GUIs 640 and 660.

Those GUIs can be added to both of the left-eye image and the right-eye image to thus provide the stereoscopic GUI to the user, or can be added to one of the left-eye image and the right-eye image. The method for adding the GUI to both of the left-eye image and the right-eye image can be inferred from the method for adding the GUI to either the left-eye image or the right-eye image. Accordingly, only the method for adding the GUI to either the left-eye image or the right-eye image according to the environment will now described for convenience of description.

FIGS. 7A, 7B and 7C depict a method for adding a GUI according to one or more exemplary embodiments. The 3D image is the image of which the left-eye image and the right-eye image are time-divided and alternately output. To graphically represent the left-eye image and the right-eye image respectively of the 3D image, circular objects 710 and 720 of the left-eye image and circular objects 750 and 770 of the right-eye image are illustrated in FIGS. 7A, 7B and 7C. The reference numerals of the objects are different from each other because the object may vary unless the object is in the left-eye image or the right-eye image of the same frame. That is, the left-eye image of the same frame uses the same reference numeral, but the left-eye image of a different frame uses a different reference numeral. This also applies to the right-eye image.

First, FIG. 7A shows a method for adding a GUI to only a left-eye image in the course of a playback according to an exemplary embodiment.

The first left-eye image L1 displays the object 710. When the command for changing a mode setting during the playback is input, a GUI ("▸ Play") 720 indicative of a current environment, a GUI ("3D : on/off") 730 relating to the mode setting change, and a GUI ("//Pause") 740 for changing to another environment are added to the first left-eye image L1.

Next, the first right-eye image R1 displays only the object 750 without a separate GUI added thereto.

Likewise, the second left-eye image L2 displays the object 760, the GUI ("▸ Play") 720 indicative of the current environment, the GUI ("3D : on/off") 730 relating to the mode setting change, and the GUI ("//Pause") 740 for changing to the other environment. The second right-eye image R2 displays only the object 770 without a separate GUI added thereto.

As such, by adding the GUI only to the left-eye image during the playback, the non-stereoscopic GUI can be provided to the user. When the GUI is added to only the right-eye image according to another exemplary embodiment, the same principle can be applied.

When the locations of those GUIs are partially changed and additionally added to the right-eye image, a stereoscopic GUI is provided.

FIG. 7B depicts a method for adding a GUI to only a left-eye image in the course of a pause according to an exemplary embodiment. When the 3D image is paused, the left-eye image and the right-eye image displayed at an input point of the pause command may be repeatedly displayed, or only one of the left-eye image and the right-eye image at the input point of the pause command may be repeatedly displayed. FIG. 7B illustrates the former case. The latter case can be inferred therefrom and thus shall be omitted herein.

The first left-eye image L1 displays the object 710. When the command for changing the mode setting is input during the pause, a GUI ("//Pause") 780 indicative of a current environment, a GUI ("3D : on/off") 730 relating to a mode setting change, and a GUI ("▸ Play") 790 for changing to another environment are added to the first left-eye image L1.

Next, the first right-eye image R1 displays only the object 750 without a separate GUI added thereto.

Likewise, as the first left-eye image L1 and the first right-eye image R1 are repeatedly and alternately displayed, the pause screen is displayed.

As above, by adding the GUI only to the left-eye image during the pause, the non-stereoscopic GUI can be provided to the user. When the GUI is added to only the right-eye image, the same principle can be applied.

When the locations of those GUIs are partially changed and also added to the right-eye image, a stereoscopic GUI is provided.

FIG. 7C depicts a method for adding a GUI to only a left-eye image in the course of a pause according to an exemplary embodiment. In FIG. 7C, only one of the left-eye image and the right-eye image displayed at the pause command input time is repeatedly displayed.

The first left-eye image L1 displays the object 710. When a command for changing the mode setting is input during the pause, a GUI ("//Pause") 780 indicative of a current environment, a GUI ("3D : on/off") 730 relating to a mode setting change, and a GUI ("▸ Play") 790 for changing to another environment are added to the first left-eye image L1.

Next, as the same screen is repeatedly displayed in succession, the pause screen is displayed.

As above, by adding the GUI to only the left-eye image during the pause, the non-stereoscopic GUI can be provided to the user. When the GUI is added to only the right-eye image, the same principle can be applied.

While the screen configuration for the mode setting is exemplified in FIGS. 7A, 7B and 7C, the screen configuration for other settings can be inferred therefrom.

Figure 8:
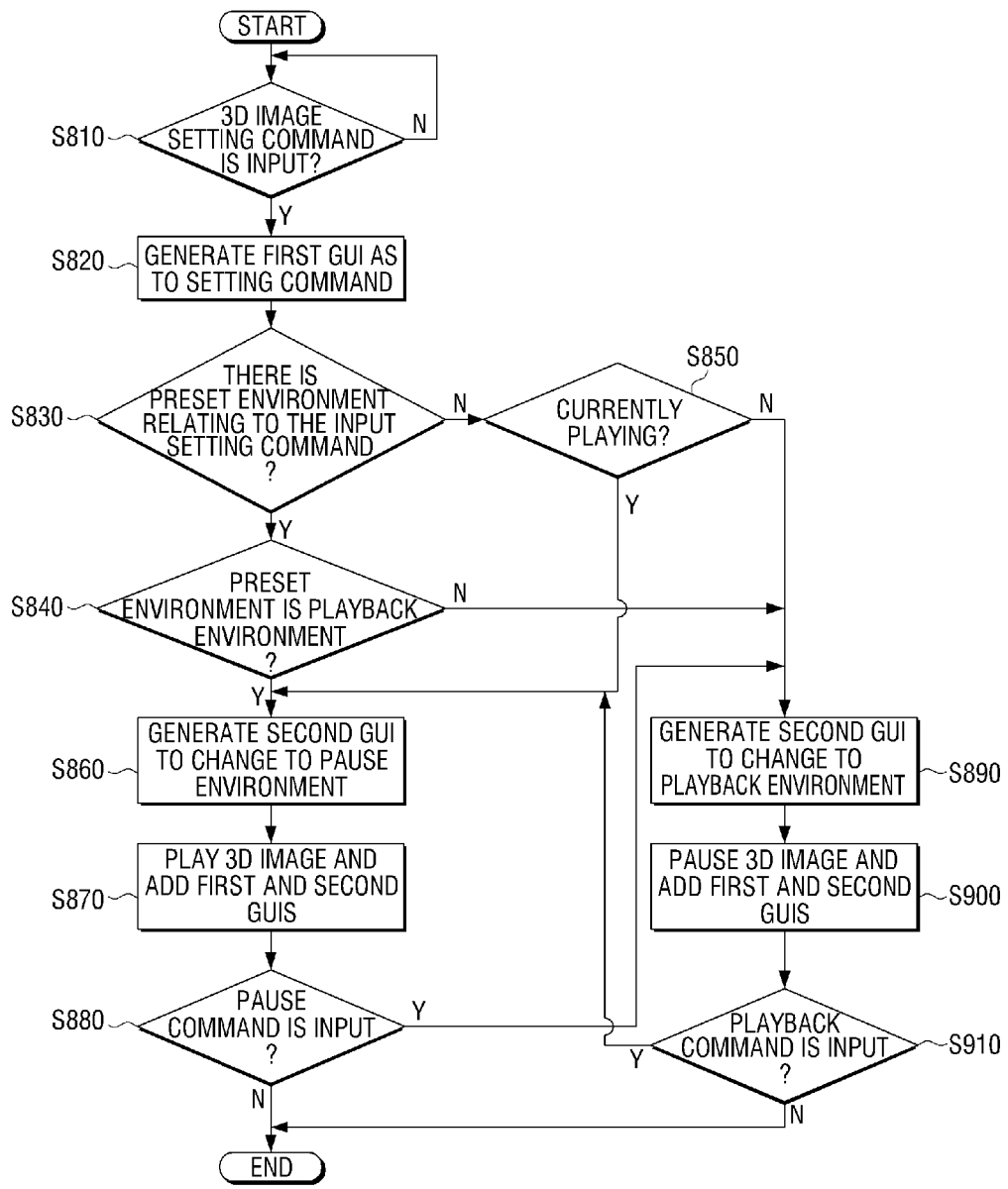
FIG. 8 is a flowchart of a GUI providing method for changing settings of a 3D image according to an exemplary embodiment.

Now, a GUI providing method for changing settings of a 3D image according to an exemplary embodiment is described with reference to FIG. 8. FIG. 8 is a flowchart of the GUI providing method for changing the settings of the 3D image according to an exemplary embodiment.

When a setting command for the 3D image is input (S810—Y), the TV 200 generates a first GUI relating to the setting command (S820). Next, the TV 200 determines whether there is a preset environment relating to the input setting command (S830). The user may preset to provide a particular environment for a particular setting command.

When the preset environment exists (S830—Y) and is a playback environment (S840—Y), the TV 200 generates a second GUI for changing to a pause environment (S860). Next, the TV 200 maintains or changes to the playback environment for the 3D image and adds the first GUI and the second GUI to the 3D image (S870).

When the preset environment exists (S830—Y) and is the pause environment (S840—N), the TV 200 generates a second GUI for changing to the playback environment (S890). Next, the TV 200 maintains or changes to the pause environment for the 3D image and adds the first GUI and the second GUI (S900).

In contrast, when detecting no preset environment relating to the input setting command (S830—N), the TV 200 examines a current environment. When the current environment is the playback environment (S850—Y), the TV 200 performs operation S860. When the current environment is the pause environment (S850—N), the TV 200 performs operation S890.

In the playback environment, the TV 200 determines whether a pause command is input (S880). When the pause command is input (S880—Y), the TV 200 performs operation S890. In the pause environment, the TV 200 determines whether a playback command is input (S910). When the playback command is input (S910—Y), the TV 200 performs operation S860.

Thus, as described above, the settings for the 3D image can be changed easily.

<GUI Providing Method for Adjusting a Depth and a Focus of a 3D Image>

In the following description, a GUI providing method for adjusting a depth and a focus of a 3D image according to one or more exemplary embodiments is explained with reference to FIGS. 9 through 15.

Figure 9:
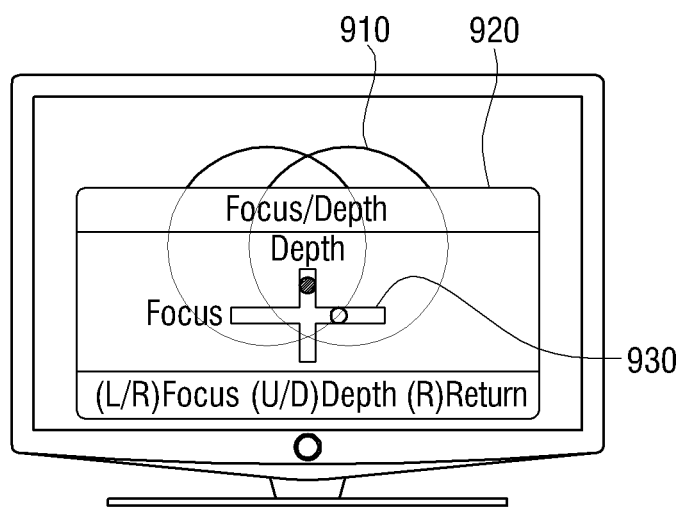
FIG. 9 is a diagram of a screen configuration according to an exemplary embodiment.

FIG. 9 is a diagram of a screen configuration according to an exemplary embodiment.

When the 3D image is input and the user inputs a command for adjusting the focus, a command for adjusting the depth, or a command for adjusting both the focus and the depth, a 3D object 910 and a GUI 920 for adjusting both the focus and the depth are displayed in the screen.

Even when the command for adjusting only the focus or the command for adjusting only the depth alone is input, the GUI 920 for adjusting both the focus and the depth may be displayed on the screen. By providing the GUI 920 for adjusting both the focus and the depth, the focus and the depth can be adjusted at the same time.

The GUI 920 includes a cross item 930 in which a control bar for adjusting the focus lies horizontally, a control bar for adjusting the depth lies vertically, and the two control bars are crossed, though it is understood that another exemplary embodiment is not limited to this arrangement. Hence, the user can adjust the focus by manipulating the horizontal control bar and adjust the depth by manipulating the vertical control bar.

The GUI 920 adds information relating to the setting currently manipulated by the user above the cross item 930, and information for guiding the horizontal manipulation, the vertical manipulation, and the return manipulation of the user below the cross item 930.

Notably, this detailed structure of the GUI 920 is a mere example to ease the understanding. When a single GUI for controlling both the focus and the depth is displayed, it is within the scope and the spirit of exemplary embodiments.

Meanwhile, the command for adjusting the focus, the command for adjusting the depth, or the command for adjusting both the focus and the depth is input by pressing a focus control button, a depth control button, or a button for controlling both the focus and the depth of a front panel of the TV 200 or a remote controller.

The 3D object 910 is an object represented due to a stereoscopic effect of same objects of a left-eye image and a right-eye image when the left-eye image and the right-eye image are time-divided and alternately displayed. To graphically represent the 3D image time-divided and alternately displayed, the 3D object 910 overlapping the circular left-eye image and the circular right-eye image is shown in FIG. 9. The objects in the left-eye image and the right-eye image are 2D objects.

Figure 10:
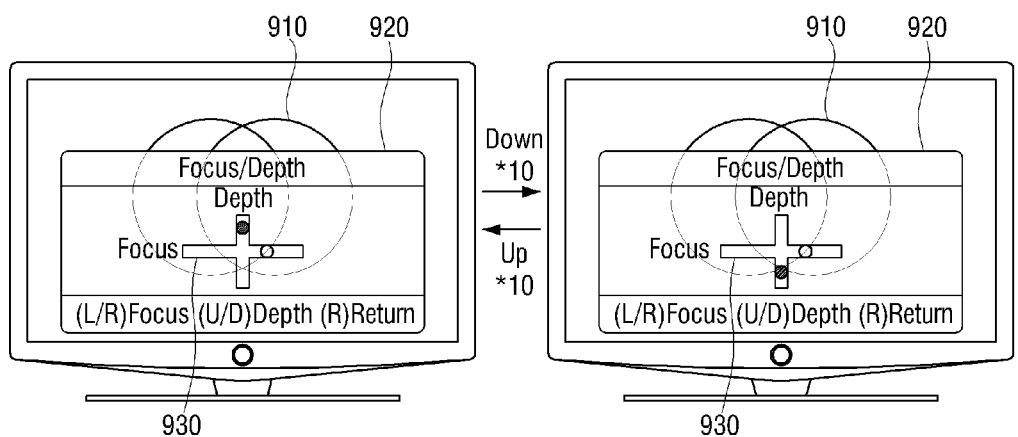
FIG. 10 is a diagram of a detailed screen change process when a depth is adjusted according to an exemplary embodiment.

FIG. 10 is a diagram of a detailed screen change process when a depth is adjusted according to an exemplary embodiment.

In the screen with the GUI 920 added to the 3D object 910, when the user presses up and down buttons of the front panel of the TV 200 or the remote controller, the screen of FIG. 10 is changed from the left screen to the right screen or from the right screen to the left screen.

The up and down buttons correspond to the vertical part of the cross item 930. Naturally, when the up or down button is pressed, the GUI 920 is altered to represent the depth change. As one can see from FIG. 10, a circular indicator inside the vertical control bar moves downward or upward.

When the command for the depth control is input through the manipulation of the up and down buttons, the TV 200 image-processes to adjust the depth of the 3D image in accordance with the input depth control command.

Figure 11:
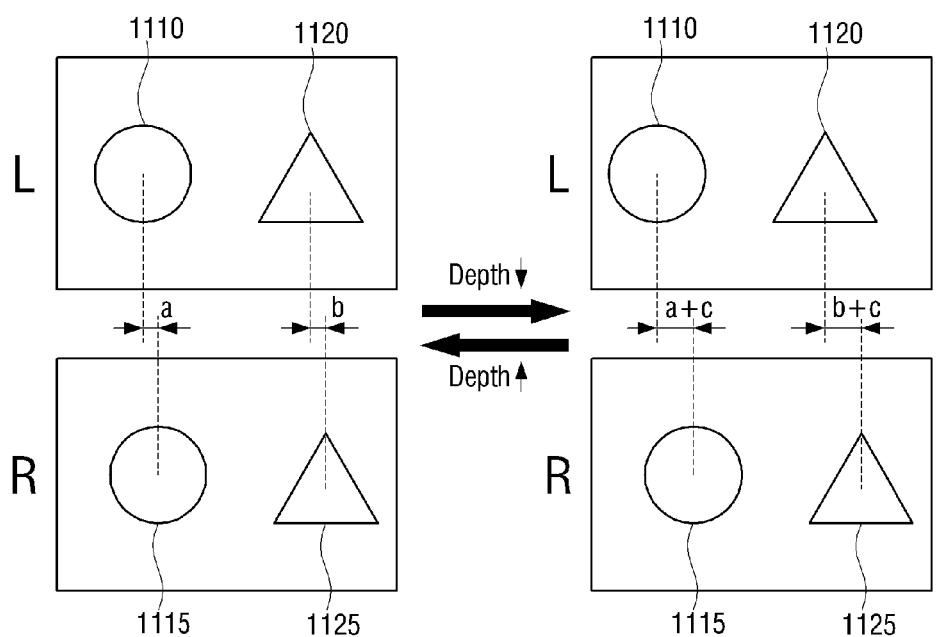
FIG. 11 is a diagram of an image processing when a depth is adjusted according to an exemplary embodiment.

The image processing is further explained with reference to FIG. 11. FIG. 11 is a diagram of an image processing when a depth is adjusted according to an exemplary embodiment.

To represent a location difference between the same objects of the left-eye image L and the right-eye image R displayed on the screen, the left-eye image L and the right-eye image R are depicted together. In the left screen of FIG. 11, the location difference between the left-eye image L and the right-eye image R for the circular object 1110 is a, and the location difference between the left-eye image L and the right-eye image R for the triangular object 1120 is b.

When the user inputs a manipulation command to lower the depth by pressing the down button, the TV 200 image-processes each object to increase the location difference between the same objects in the left-eye image L and the right-eye image R.

When the manipulation command for lowering the depth is input, the TV 200 equally changes the location variation between the objects such that the location difference between the left-eye image L and the right-eye image R for the circular object 1110 becomes a+c and the location difference between the left-eye image L and the right-eye image R for the triangular object 1120 becomes b+c as shown in the right screen of FIG. 11.

As a result, the depth throughout the screen including the circular object 1110 and the triangular object 1120 decreases.

Conversely, when the user inputs a manipulation command to raise the depth by pressing the up button, the TV 200 image-processes each object to decrease the location difference between the same objects in the left-eye image L and the right-eye image R.

When the manipulation command for raising the depth is input in the right screen of FIG. 11, the TV 200 image-processes each object such that the location difference of the left-eye image L and the right-eye image R for the circular object 1110 becomes (a+c)−c=a and the location difference of the left-eye image L and the right-eye image R for the triangular object 1120 becomes (b+c)−c=b as shown in the left screen of FIG. 11. That is, the location variation between the objects becomes alike.

As a result, the depth throughout the screen including the circular object 1110 and the triangular object 1120 increases.

The location variation can be changed by moving only the location of the object in the left-eye image L, by moving only the location of the object in the right-eye image R, or by moving the locations of the objects in both the left-eye image L and the right-eye image R according to various exemplary embodiments.

The image processing method for decreasing the depth and the image processing method for increasing the depth are mere examples to facilitate the understanding. Accordingly, the image processing for increasing or decreasing the depth can be accomplished using other methods without departing from the scope and spirit of exemplary embodiments.

Figure 12:
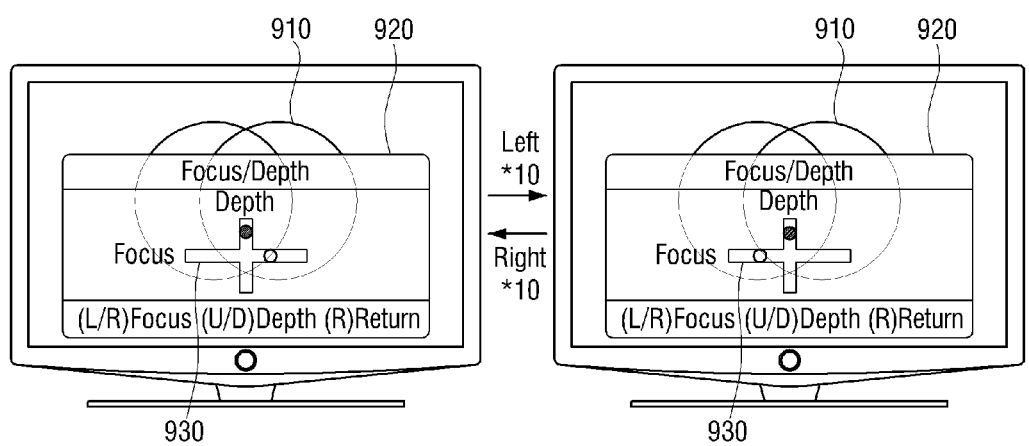
FIG. 12 is a diagram of a detailed screen change process when a focus is adjusted according to an exemplary embodiment.

FIG. 12 is a diagram of a detailed screen change process when a focus is adjusted according to an exemplary embodiment.

In the screen with the GUI 920 added to the 3D object 910, when the user presses left and right buttons of the front panel of the TV 200 or the remote controller, the screen of FIG. 12 is changed from the left screen to the right screen or from the right screen to the left screen.

The left and right buttons correspond to the horizontal part of the cross item 930. Accordingly, when the left and right button is pressed, the GUI 920 is altered to represent the focus change.

As one can see from FIG. 12, a circular indicator inside the horizontal control bar moves from the left to the right or from the right to the left.

When a command for the focus control is input through the manipulation of the left and right buttons, the TV 200 image-processes to adjust the focus of the 3D image in accordance with the input focus control command.

Figure 13:
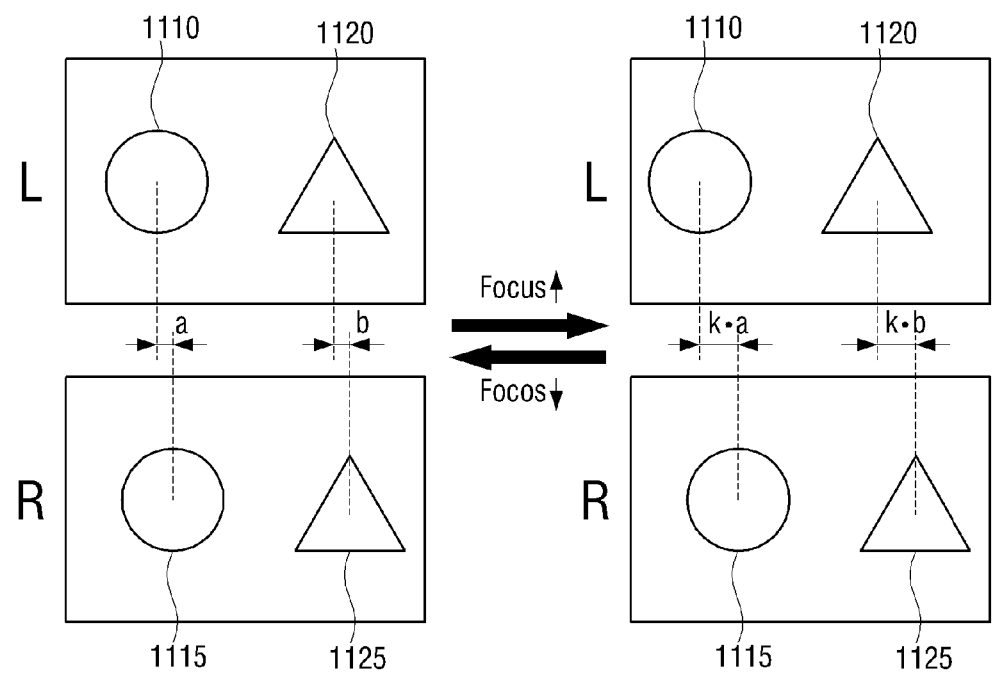
FIG. 13 is a diagram of an image processing when a focus is adjusted according to an exemplary embodiment.

The image processing is further explained with reference to FIG. 13. FIG. 13 is a diagram of the image processing when the focus is adjusted.

To represent a location difference between the same objects of the left-eye image L and the right-eye image R displayed on the screen, the left-eye image L and the right-eye image R are depicted together in FIG. 13. In the left screen of FIG. 13, the location difference of the left-eye image L and the right-eye image R for the circular object 1110 is a, and the location difference of the left-eye image L and the right-eye image R for the triangular object 1120 is b.

When the user inputs a manipulation command to increase the focus by pressing the left button, the TV 200 image-processes each object to increase the location difference between the same objects in the left-eye image L and the right-eye image R.

When the manipulation command to increase the focus is input, the TV 200 differently changes a location variation between the objects such that the location difference of the left-eye image L and the right-eye image R for the circular object 1110 becomes k*a and the location difference of the left-eye image L and the right-eye image R for the triangular object 1120 becomes k*b as shown in the right screen of FIG. 13.

As a result, the focus throughout the screen including the circular object 1110 and the triangular object 1120 increases.

Conversely, when the user inputs a manipulation command to decrease the focus by pressing the right button, the TV 200 image-processes each object to decrease the location difference between the same objects in the left-eye image L and the right-eye image R.

When the manipulation command to decrease the focus is input in the right screen of FIG. 13, the TV 200 image-processes each object such that the location difference of the left-eye image L and the right-eye image R for the circular object 1110 becomes (k*a)/k=a and the location difference of the left-eye image L and the right-eye image R for the triangular object 1120 becomes (k*b)/k=b as shown in the left screen of FIG. 13. That is, while the location variation between the objects differs, the location difference between the objects varies at the same rate.

As a result, the focus throughout the screen including the circular object 1110 and the triangular object 1120 decreases.

Such location variation can be changed by moving only the location of the object in the left-eye image L, by moving only the location of the object in the right-eye image R, or by moving the locations of the objects in both the left-eye image L and the right-eye image R.

The image processing method for increasing the focus and the image processing method for decreasing the focus are mere examples to facilitate the understanding. Accordingly, exemplary embodiments can implement image processing for increasing or decreasing the focus using other methods.

Figure 14:
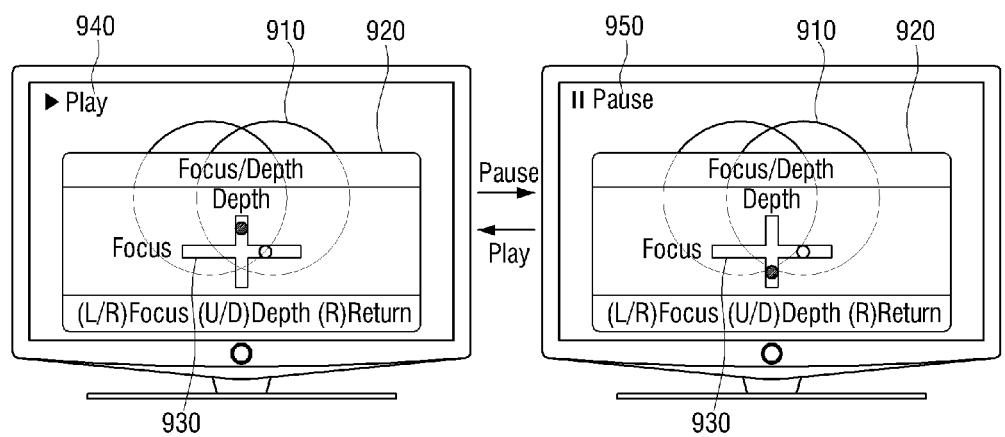
FIG. 14 is a diagram of an environment for a focus/depth setting according to an exemplary embodiment.

FIG. 14 is a diagram of an environment for setting a focus/depth according to an exemplary embodiment.

When a 3D image is input and a user inputs a command for adjusting a focus, a command for adjusting a depth, or a command for adjusting both the focus and the depth, the 3D object 910 is displayed together with the GUI 920 for adjusting both the focus and the depth on the screen.

The GUI 920 includes a cross item 930 in which a control bar for adjusting the focus lies horizontally, a control bar for adjusting the depth lies vertically, and the two control bars are crossed.

As marked by the "▶ Play" icon 940 in the left screen, the focus control and the depth control can be applied during a playback. In so doing, when the user inputs the focus control command or the depth control command, the focus and the depth can be controlled even during the 3D image playback by image-processing objects in the left-eye images and the right-eye images input in real time.

When the user presses a pause button of a front panel of a TV 200 or a pause button of a remote controller, the 3D image is paused as shown in the right screen of FIG. 14. At this time, the GUI 920 for adjusting the focus and the depth still remains.

As marked by the "//Pause" icon 950 in the right screen, the focus control and the depth control can be applied even during the pause. In so doing, when the user inputs the focus control command or the depth control command, the focus and the depth can be controlled even during the paused 3D image by image-processing objects in the left-eye image and the right-eye image of the pause command input time.

When the user presses a playback button of the front panel of the TV 200 or a playback button of the remote controller, the 3D image is played as shown in the left screen of FIG. 14. At this time, the GUI 920 for adjusting the focus and the depth still remains.

Thus, the focus setting change and the depth setting change for the 3D image can be further facilitated and simplified.

Figure 15:
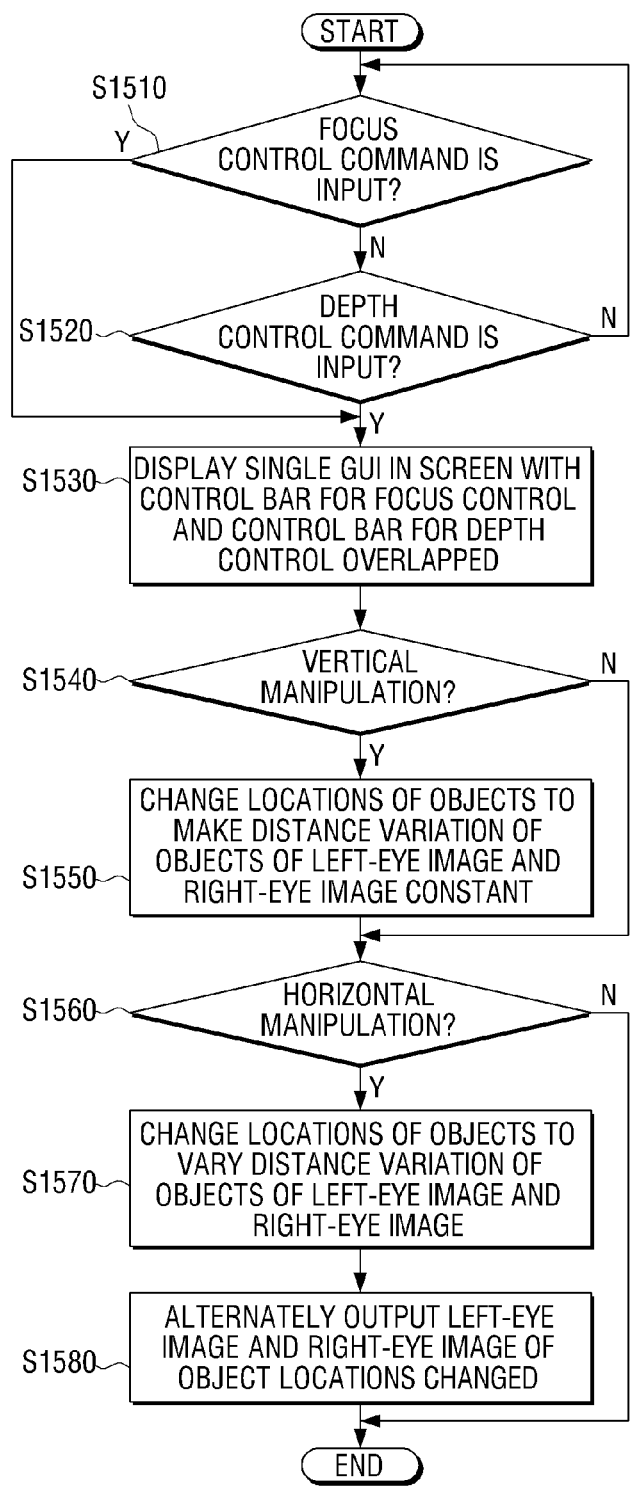
FIG. 15 is a flowchart of a GUI providing method according to an exemplary embodiment.

Hereafter, operations for controlling a focus and a depth of a 3D image according to an exemplary embodiment are provided with reference to FIG. 15. FIG. 15 is a flowchart of a GUI providing method according to an exemplary embodiment.

When a focus control command is input (S1510—Y) or when a depth control command is input (S1520—Y), the TV 200 generates a GUI overlapping a control bar for adjusting the focus and a control bar for adjusting the depth and displays the generated GUI on a screen (S1530).

When a user's vertical manipulation command is input through up and down buttons of a front panel of a TV 200 or up and down buttons of a remote controller (S1540—Y), the TV 200 changes locations of objects such that a distance variation of the objects of a left-eye image and a right-eye image is constant, by image-processing the left-eye image and the right-eye image (S1550). That is, when the user's vertical manipulation is input, the TV 200 changes the depth of the 3D image based on the input vertical manipulation.

When the user's horizontal manipulation command is input through left and right button of the front panel of the TV 200 or left and right buttons of the remote controller (S1560—Y), the TV 200 changes the locations of the objects such that the distance variation of the objects of the left-eye image and the right-eye image varies, by image-processing the left-eye image and the right-eye image (S1570). That is, when the user's horizontal manipulation is input, the TV 200 changes the focus of the 3D image based on the input horizontal manipulation.

Next, the TV 200 alternately outputs the left-eye image and the right-eye image including the changed locations of the objects (S1580).

As described above, the focus is controlled using the vertical manipulation and the depth is controlled using the horizontal manipulation to ease the understanding. However, it is understood that other exemplary embodiments are not limited thereto, and the depth control using the vertical manipulation and the focus control using the horizontal manipulation may be provided in another exemplary embodiment.

While both the focus control and the depth control are carried out using the cross item by way of example, the form of the GUI item(s) or the GUI can vary in other exemplary embodiments.

<GUI Providing Method for Adjusting a Stereoscopic Effect of a 3D Image>

Referring to FIGS. 16 through 19, a GUI providing method for adjusting a stereoscopic effect of a 3D image is explained.

Figure 16:
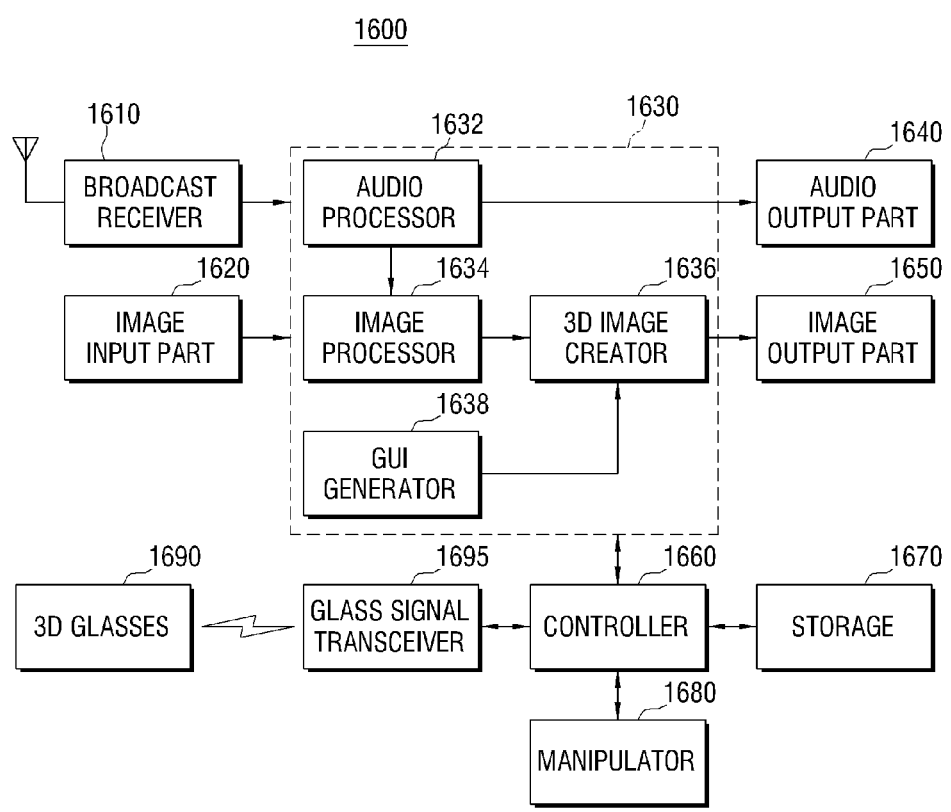
FIG. 16 is a detailed block diagram of a 3D TV according to an exemplary embodiment.

FIG. 16 is a detailed block diagram of a 3D TV 1600 according to an exemplary embodiment. The 3D TV 1600 of FIG. 16 includes a broadcast receiver 1610, an image input part 1620, an audio/video (A/V) processor 1630, an audio output part 1640, an image output part 1650, a controller 1660, a storage 1670, a manipulator 1680, and a glass signal transceiver 1695.

The broadcast receiver 1610 receives and demodulates a broadcast from a broadcasting station or a satellite by wire or wirelessly. The broadcast receiver 1610 also receives a 3D image signal including 3D image data.

The image input part 1620 is connected to an external device and receives an image. In particular, the image input part 1620 can receive the 3D image data from the external device. The image input part 1620 can interface via, for example, at least one of S-Video, Component, Composite, D-Sub, DVI, and HDMI.

Herein, the 3D image data indicates data including 3D image information. The 3D image data includes left-eye image data and right-eye image data in one data frame region. Based on a pattern including the left-eye image data and the right-eye image data, a type of the 3D image data is classified.

The A/V processor 1630 performs a signal processing such as video decoding, video scaling, and audio decoding and generates the GUI with respect to the image signal and the audio signal fed from at least one of the broadcast receiver 1610 and the image input part 1620.

When the input image and audio signals are stored in the storage 1670, the A/V processor 1630 compresses the input image and audio to store the compressed image and audio.

The A/V processor 1630 includes an audio processor 1632, an image processor 1634, a 3D image creator 1636, and a GUI generator 1638 as shown in FIG. 16.

The audio processor 1632 processes (for example, decodes) the audio of the input audio signal. The audio processor 1632 outputs the processed audio signal to the audio output part 1640.

The image processor 1634 processes the input image signal (for example, decodes and scales the video). When the 3D image data is input, the image processor 1634 outputs the input 3D image data to the 3D image creator 1636.

The 3D image creator 1636 generates the left-eye image and the right-eye image interpolated to the size of the full screen, using the input 3D image data. To create the 3D stereoscopic image, the 3D image creator 1636 generates the left-eye image and the right-eye image to display on the screen.

More specifically, the 3D image creator 1636 separates the left-eye image data and the right-eye image data from the input 3D image data. Since one frame data may include both the left-eye image data and the right-eye image data, the separated left-eye image data and right-eye image data each include the image data corresponding to half of the whole screen size. Accordingly, the 3D image creator 1636 generates the left-eye image and the right-eye image to be displayed on the full screen by enlarging twice or interpolating the separated left-eye image data and right-eye image data. Next, the 3D image creator 1636 outputs the generated left-eye image and right-eye image to the image output part 1650 to alternately display them.

The GUI generator 1638 can generate a GUI for an environment setting of the 3D TV 1600. The GUI includes an item for setting a stereoscopy control element combining a depth and a focus of the 3D image to control a stereoscopic effect of the 3D image.

Herein, by combining the depth and the focus, the stereoscopy control element is divided to three stages as the element for controlling the stereoscopic effect of the 3D image. Herein, the three stages include Low, Standard, and High. The Low indicates a lowest stereoscopic effect, the High indicates a highest stereoscopic effect, and the Standard indicates a medium stereoscopic effect between the Low and the High. For example, the Low can set the depth value to 0 and the focus value to 140, the High can set the depth value to 80 and the focus value to 100, and the Standard can set the depth value to 40 and the focus value to 120. Herein, the setting values of the three stages are merely exemplary, and the three stages can use other setting values in other exemplary embodiments. Furthermore, another exemplary embodiment may have less than or more than three stages.

The audio output part 1640 outputs the audio fed from the A/V processor 1630 to a speaker.

The image output part 1650 outputs the image output from the A/V processor 1630 to display the image on the screen. As for the 3D image, the image output part 1650 alternately outputs the left-eye image and the right-eye image onto the screen.

The storage 1670 stores the image received from the broadcast receiver 1610 or the image input part 1620. The storage 1670 can be external or internal, and may be a volatile memory (such as RAM) or a non-volatile memory (such as ROM, flash memory, or a hard disk drive).

The manipulator 1680 receives and forwards a user's manipulation to the controller 1660. The manipulator 1680 can be implemented using a remote controller, a pointing device, a touchpad, a touch screen, etc.

The glass signal transceiver 1695 sends a clock signal to alternately open the left-eye glass and the right-eye glass of the 3D glasses 1690. The 3D glasses 1690 alternately open the left-eye glass and the right-eye glass according to the received clock signal. The glass signal transceiver 1695 receives status information from the 3D glasses 1690.

The controller 1660 acquires a user command based on the manipulation of the user fed from the manipulator 1680, and controls the operations of the 3D TV 1600 according to the acquired user command.

When one of the three stages of the stereoscopy control element of the 3D image is set through the GUI generated by the GUI generator 1638, the controller 1660 controls to modify the left-eye image and the right-eye image of the 3D image in accordance with the set stage. That is, when the value of the stereoscopy control element is set to the High through the manipulation of the user, the controller 1660 controls to change the depth value and the focus value of the left-eye image and the right-eye image of the 3D image to 80 and 100, respectively.

When the stereoscopy control element of the 3D image is set to one of the three stages, the controller 1660 controls to switch the left-eye images and the right-eye images input in real time during a playback of the 3D image, or to change the paused left-eye image and right-eye image during a pause of the 3D image.

When the stereoscopy control element of the 3D image is set to one of the three stages, the controller 1660 controls to change a distance between a location of a particular object of the left-eye image and the location of a particular object of the right-eye image on the screen according to the stereoscopy of the set stage.

According to the stereoscopy control element defined via the GUI, the controller 1660 can control to provide a preview of the 3D image with the adjusted stereoscopic effect in an exemplary embodiment. In more detail, when the stereoscopy control element is set through the GUI, the controller 1660 controls to generate the left-eye image and the right-eye image of the 3D image corresponding to the set stage, and to alternately output the generated left-eye image and right-eye image. The generated left-eye image and right-eye image may be smaller than the full screen size.

Figure 17:
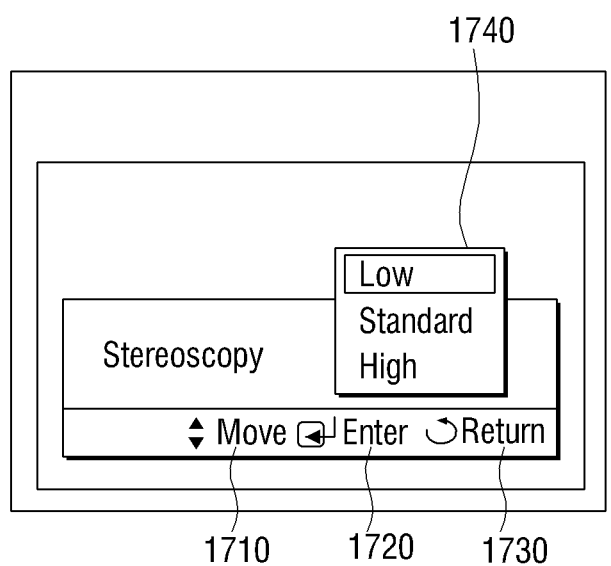
FIG. 17 is a diagram of a GUI including an element for adjusting a stereoscopic effect according to an exemplary embodiment.
Figure 18A:
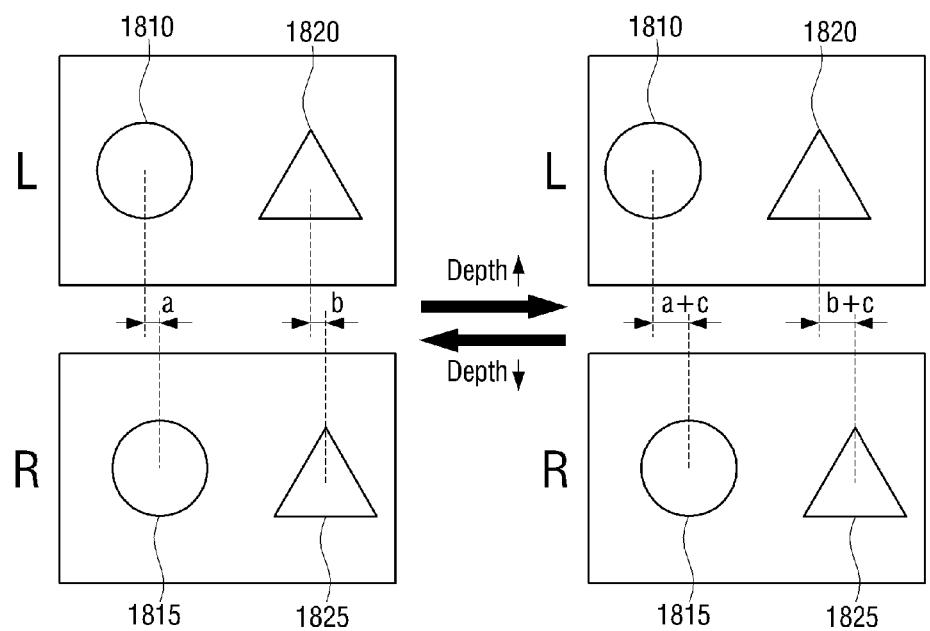
FIG. 18A is a diagram of an image processing when a depth is adjusted according to an exemplary embodiment.
Figure 18B:
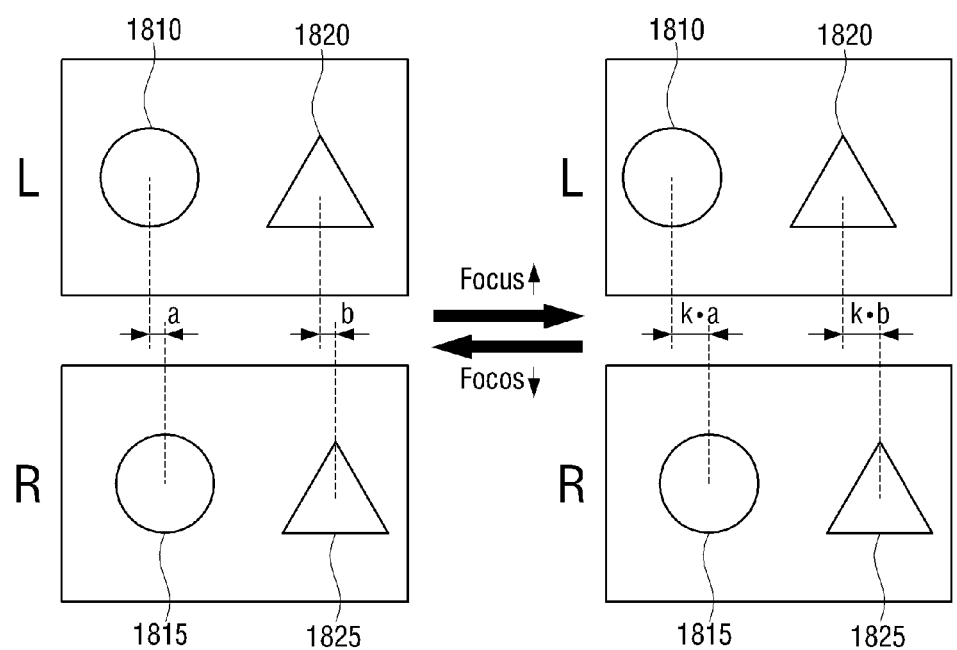
FIG. 18B is a diagram of an image processing when a focus is adjusted according to an exemplary embodiment.

Referring to FIGS. 17, 18A and 18B, a method for adjusting a stereoscopic effect of a 3D image according to one or more exemplary embodiments is described.

FIG. 17 depicts a GUI including an element for adjusting a stereoscopic effect according to an exemplary embodiment.

When the 3D image is input and the user inputs a command for a stereoscopy control, the GUI is displayed on a screen as shown in FIG. 17. In general, to adjust the stereoscopy of the 3D image, at least one of a focus and a depth is separately adjusted. By providing the GUI including the single element for controlling the stereoscopic effect as shown in FIG. 17, the focus control and the depth control can be accomplished at the same time.

Herein, the depth of the 3D image indicates a distance of an object on the screen, and the focus indicates whether the stereoscopic object is positioned in front of the screen or behind the screen. For example, provided that the depth can be adjusted from 0 to 100, the depth 0 represents the 3D image like a 2D image and the depth 100 maximizes the stereoscopic effect. Provided that the focus can be adjusted from 0 to 255, the focus 0 makes the image appear farthest from the screen and the focus 255 makes the image appear closest in the screen.

In the following description, a depth control and a focus control of a 3D image according to one or more exemplary embodiments are explained with reference to FIGS. 18A and 18B.

FIG. 18A depicts an image processing when a depth is adjusted according to an exemplary embodiment.

To represent a location difference between same objects of a left-eye image L and a right-eye image R displayed on a screen, the left-eye image L and the right-eye image R are shown together in FIG. 18A. In the left screen of FIG. 18A, the location difference between the left-eye image L and the right-eye image R for the circular object 1810 is a, and the location difference between the left-eye image L and the right-eye image R for the triangular object 1820 is b.

When the depth value increases, the 3D TV 1600 image-processes each object to increase the location difference between the same objects of the left-eye image L and the right-eye image R.

More specifically, the 3D TV 1600 equally changes the location variation between the objects such that the location difference of the left-eye image L and the right-eye image R for the circular object 1810 becomes a+c and the location difference of the left-eye image L and the right-eye image R for the triangular object 1820 becomes b+c as shown in the right screen of FIG. 18A.

Thus, the depth throughout the screen including the circular object 1810 and the triangular object 1820 increases.

Conversely, when the depth value decreases, the 3D TV 1600 image-processes each object to decrease the location difference between the same objects of the left-eye image L and the right-eye image R.

More specifically, the 3D TV 1600 image-processes each object such that the location difference of the left-eye image L and the right-eye image R for the circular object 1810 becomes (a+c)−c=a and the location difference of the left-eye image L and the right-eye image R for the triangular object 1820 becomes (b+c)−c=b as shown in the left screen of FIG. 18A. That is, the location variation between the objects becomes less.

FIG. 18B is a diagram of an image processing when a focus is adjusted according to an exemplary embodiment.

To represent a location difference between same objects of a left-eye image L and a right-eye image R displayed on the screen, the left-eye image L and the right-eye image R are shown together in FIG. 18B. In the left screen of FIG. 18B, the location difference between the left-eye image L and the right-eye image R for the circular object 1810 is a, and the location difference between the left-eye image L and the right-eye image R for the triangular object 1820 is b.

When the focus value increases, the 3D TV 1600 image-processes each object to increase the location difference between the same objects of the left-eye image L and the right-eye image R.

More specifically, the 3D TV 1600 differently changes the location variation between the objects such that the location difference of the left-eye image L and the right-eye image R for the circular object 1810 becomes k*a and the location difference of the left-eye image L and the right-eye image R for the triangular object 1820 becomes k*b as shown in the right screen of FIG. 18B.

As a result, the focus throughout the screen including the circular object 1810 and the triangular object 1820 increases.

Conversely, when the focus value decreases, the 3D TV 1600 image-processes each object to decrease the location difference between the same objects in the left-eye image L and the right-eye image R.

More specifically, the 3D TV 1600 image-processes each object such that the location difference of the left-eye image L and the right-eye image R for the circular object 1810 becomes (k*a)/k=a and the location difference of the left-eye image L and the right-eye image R for the triangular object 1820 becomes (k*b)/k=b as shown in the left screen of FIG. 18B. That is, while the location variation between the objects differs, the location difference between the objects varies at the same rate. As a result, the focus throughout the screen including the circular object 1810 and the triangular object 1820 lowers.

Such location variation can be changed by moving only the location of the object in the left-eye image L, by moving only the location of the object in the right-eye image R, or by moving the locations of all of the objects in the left-eye image L and the right-eye image R according to various exemplary embodiments.

Referring back to FIG. 17, the GUI includes information 1710 relating to a Move key, information 1720 relating to an Enter key, information 1730 relating to a Return to the 3D image, and an item 1740 for setting a stage of a stereoscopy control element. The information 1710 relating to the Move key informs of the vertical button manipulation of the remote controller for moving the stage of the 3D image stereoscopy. The information 1720 relating to the Enter indicates a remote controller enter button for selecting the user's desired stereoscopy stage. The information 1730 relating to the Return to the 3D image indicates a remote controller return button for executing the 3D image based on a selected stereoscopy stage. The item 1740 for setting the stage of the stereoscopy control element includes three stages of the 3D image stereoscopic effect level, though it is understood that another exemplary embodiment is not limited thereto.

Herein, the three stages include Low, Standard, and High. The Low indicates a lowest stereoscopic effect, the High indicates a highest stereoscopic effect, and the Standard indicates a medium stereoscopic effect between the Low and the High. For example, the Low can set the depth value to 0 and the focus value to 140, the High can set the depth value to 80 and the focus value to 100, and the Standard can set the depth value to 40 and the focus value to 120. Herein, the setting values of the three stages are merely exemplary, and the three stages can use other setting values.

Operations for adjusting a stereoscopy of a 3D image according to an exemplary embodiment will now be described with reference to FIG. 19.

Figure 19:
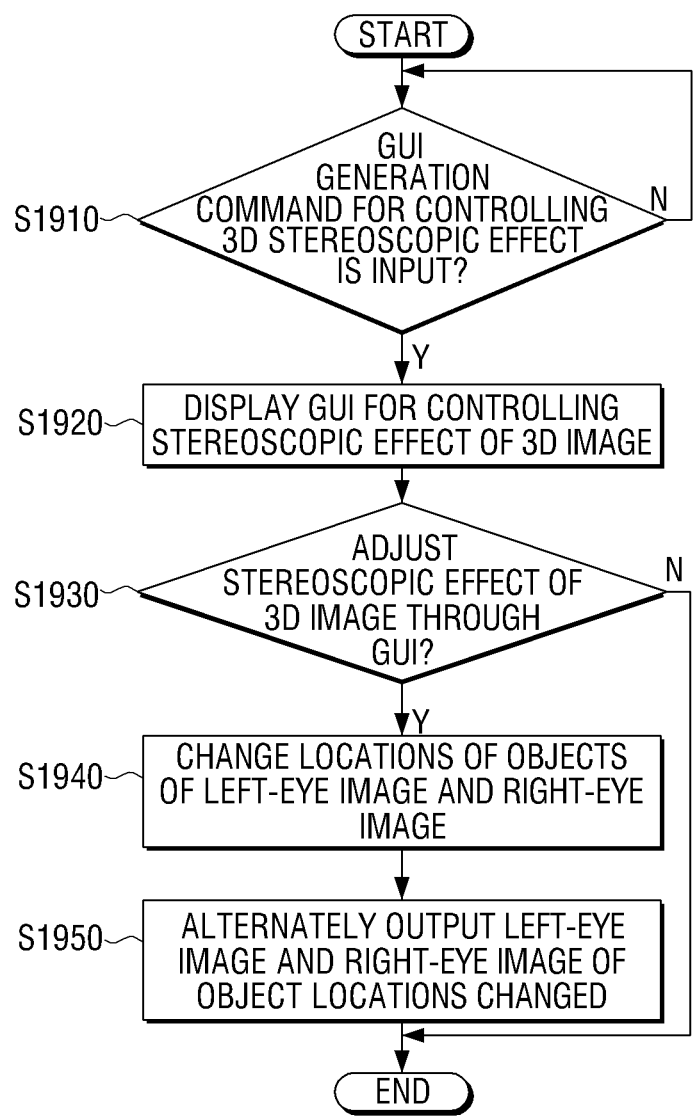
FIG. 19 is a flowchart of a GUI providing method according to an exemplary embodiment.

FIG. 19 is a flowchart of a GUI providing method according to an exemplary embodiment.

Referring to FIG. 19, when a GUI generation command for adjusting a stereoscopy of a 3D image is input (S1910—Y), the 3D TV 1600 generates the GUI for adjusting the stereoscopy of the 3D image as described in FIG. 17 and displays the generated GUI on a screen (S1920). To adjust the stereoscopic effect of the 3D image, the GUI includes an item for setting a stage of a stereoscopy control element combining a depth control and a focus control of the 3D image.

Herein, by combining the depth control and the focus control, the stereoscopy control element is divided to three stages as an element for controlling the stereoscopic effect of the 3D image. Herein, the three stages include a Low, a Standard, and a High. The Low indicates a lowest stereoscopic effect, the High indicates a highest stereoscopic effect, and the Standard indicates a medium stereoscopic effect between the Low and the High. For example, the Low can set the depth value to 0 and the focus value to 140, the High can set the depth value to 80 and the focus value to 100, and the Standard can set the depth value to 40 and the focus value to 120. Herein, the setting values of the three stages are merely exemplary, and the three stages can use other setting values in another exemplary embodiment.

Next, when the control command of the stereoscopic effect of the 3D image is input through the generated GUI (S1930—Y), the 3D TV 1600 modifies locations of objects in a left-eye image and a right-eye image by image-processing the left-eye image and the right-eye image (S1940). For example, when instructed to set the Low stage of the stereoscopy control element, the depth value is set to 0, the focus value is set to 140, and the 3D TV 1600 changes the locations of the objects of the left-eye image and the right-eye image accordingly. Next, the 3D TV 1600 alternately outputs the left-eye image and the right-eye image with the changed locations of the objects (S1950). At this time, the left-eye image and the right-eye image, which are output in a size smaller than a full screen size, can be output as a preview.

So far, the stages for adjusting the stereoscopy of the 3D image are three by way of example. However, it is understood that another exemplary embodiment may apply a plurality of stages other than the three stages.

While the stereoscopy control element combines the depth and the focus by way of example, another exemplary embodiment may apply a stereoscopy control element which combines elements other than the depth and the focus.

<3D GUI Providing Method>

A GUI providing method according to one or more exemplary embodiments will now be described with reference to FIGS. 20 through 23.

Figure 20:
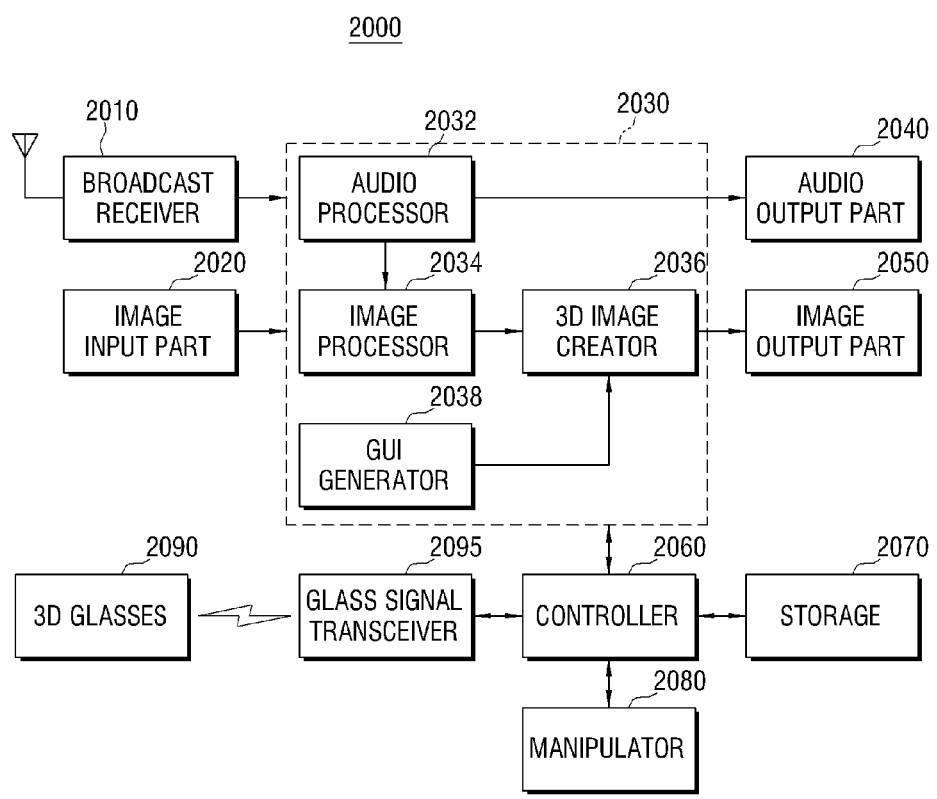
FIG. 20 is a detailed block diagram of a 3D TV according to an exemplary embodiment.

FIG. 20 is a detailed block diagram of a 3D TV 2000 according to an exemplary embodiment. The 3D TV 2000 of FIG. 20 includes a broadcast receiver 2010, an image input part 2020, an audio/video (A/V) processor 2030, an audio output part 2040, an image output part 2050, a controller 2060, a storage 2070, a manipulator 2080, and a glass signal transceiver 2095.

The broadcast receiver 2010 receives and demodulates a broadcast from a broadcasting station or a satellite by wire or wirelessly. The broadcast receiver 2010 also receives a 3D image signal including 3D image data.

The image input part 2020 is connected to an external device to receive the image. In particular, the image input part 2020 can receive 3D image data from the external device. The image input part 2020 can interface with, for example, at least one of S-Video, Component, Composite, D-Sub, DVI, and HDMI.

Herein, the 3D image data indicates data including 3D image information. The 3D image data includes left-eye image data and right-eye image data in one data frame region. Based on a pattern including the left-eye image data and the right-eye image data, a type of the 3D image data is classified.

The A/V processor 2030 performs signal processing such as video decoding, video scaling, and audio decoding and generates a GUI with respect to the image signal and the audio signal fed from at least one of the broadcast receiver 2010 and the image input part 2020.

When the input image and audio signals are stored in the storage 2070, the A/V processor 2030 compresses the input image and audio to store the compressed image and audio.

The A/V processor 2030 includes an audio processor 2032, an image processor 2034, a 3D image creator 2036, and a GUI generator 2038 as shown in FIG. 20.

The audio processor 2032 processes (for example, decodes) the audio of the input audio signal. The audio processor 2032 outputs the processed audio signal to the audio output part 2040.

The image processor 2034 processes the input image signal (for example, decodes and scales the video). When the 3D image data is input, the image processor 2034 outputs the input 3D image data to the 3D image creator 2036.

The 3D image creator 2036 generates the left-eye image and the right-eye image interpolated to a size of a full screen, using the input 3D image data. To create the 3D stereoscopic image, the 3D image creator 2036 generates the left-eye image and the right-eye image to display on the screen.

More specifically, the 3D image creator 2036 separates the left-eye image data and the right-eye image data from the input 3D image data. Since one frame data may include both the left-eye image data and the right-eye image data, the separated left-eye image data and right-eye image data each include the image data corresponding to half of the whole screen size. Accordingly, the 3D image creator 2036 generates the left-eye image and the right-eye image to be displayed in the full screen by enlarging twice or interpolating the separated left-eye image data and right-eye image data. Next, the 3D image creator 2036 outputs the generated left-eye image and right-eye image to the image output part 2050 to alternately display them.

When the user inputs the GUI generation command, the 3D image creator 2036 may generate only one of the left-eye image and the right-eye image of the input 3D image and output the generated image to the image output part 2050. Next, when the user inputs a GUI end command or when a certain time passes without using the GUI, the 3D image creator 2036 generates both the left-eye image and the right-eye image of the 3D image which is input again.

The GUI generator 2038 generates a GUI for an environment setting of the 3D image display apparatus. The generated GUI may be a 3D type GUI. Herein, the 3D type GUI can consider two cases. The first case is a 2D GUI which looks like the 3D image. The second case generates the 3D GUI by generating the left-eye 3D GUI and the right-eye 3D GUI similar to the 3D image.

In the first case, the GUI generator 2038 generates the 2D GUI. The 2D GUI looks likes the stereoscopic 3D GUI, rather than the general plain 2D GUI. However, the user can see the 3D type GUI without using the 3D glasses 2090.

In the second case, the GUI generator 2038 generates the GUI including the left-eye 3D GUI and the right-eye 3D GUI similar to the 3D image. Accordingly, the 3D GUI data including the generated left-eye 3D GUI and right-eye 3D GUI is input to the 3D image creator 2036. The 3D image creator 2036 generates the left-eye 3D GUI and the right-eye 3D GUI. The 3D image creator 2036 alternately outputs the generated left-eye 3D GUI and the generated right-eye 3D GUI to the image output part 2050.

The audio output part 2040 outputs the audio fed from the A/V processor 2030 to a speaker.

The image output part 2050 outputs the image fed from the A/V processor 2030 to display the image on the screen. As for the 3D image, the image output part 2050 alternately outputs the left-eye image and the right-eye image onto the screen.

The storage 2070 stores the image received from the broadcast receiver 2010 or the image input part 2020. The storage 2070 can be external or internal, and may be a volatile memory (such as RAM) or a non-volatile memory (such as ROM, flash memory, or a hard disk drive).

The manipulator 2080 receives and forwards a user's manipulation to the controller 2060. The manipulator 2080 can be implemented using a remote controller, a pointing device, a touchpad, a touch screen, etc.

The glass signal transceiver 2095 sends a clock signal to alternately open the left-eye glass and the right-eye glass of the 3D glasses 2090. The 3D glasses 2090 alternately open the left-eye glass and the right-eye glass according to the received clock signal. The glass signal transceiver 2095 receives status information from the 3D glasses 2090.

The controller 2060 acquires a user command based on the manipulation of the user fed from the manipulator 2080, and controls the operations of the TV according to the acquired user command.

When the generation command of the GUI to be displayed in the 3D image is input through the manipulator 2080, the controller 2060 controls to output only one of the left-eye image and the right-eye image and to output the GUI generated by the GUI generator 2038 together with the one image. In so doing, when the 3D image creator 2036 generates the left-eye 3D GUI and the right-eye 3D GUI based on the 3D GUI data generated by the GUI generator 2038, the controller 2060 controls to alternately output the left-eye GUI and the right-eye GUI together with any one of the generated left-eye image and right-eye image.

When the generation command of the 3D GUI to be displayed over the 3D image is input through the user's manipulation and the 3D image creator 2036 generates only one of the left-eye image and the right-eye image of the 3D image, the controller 2060 controls to output one of the generated left-eye image and the generated right-eye image. When a 3D GUI end command is input through the user's manipulation, the controller 2060 controls to alternately output the left-eye image and the right-eye image corresponding to the 3D image which is input again.

After a certain time period passes by without using the 3D GUI, the controller 2060 may automatically end the GUI and control to alternately output the left-eye image and the right-eye image corresponding to the input 3D image.

Figure 21:
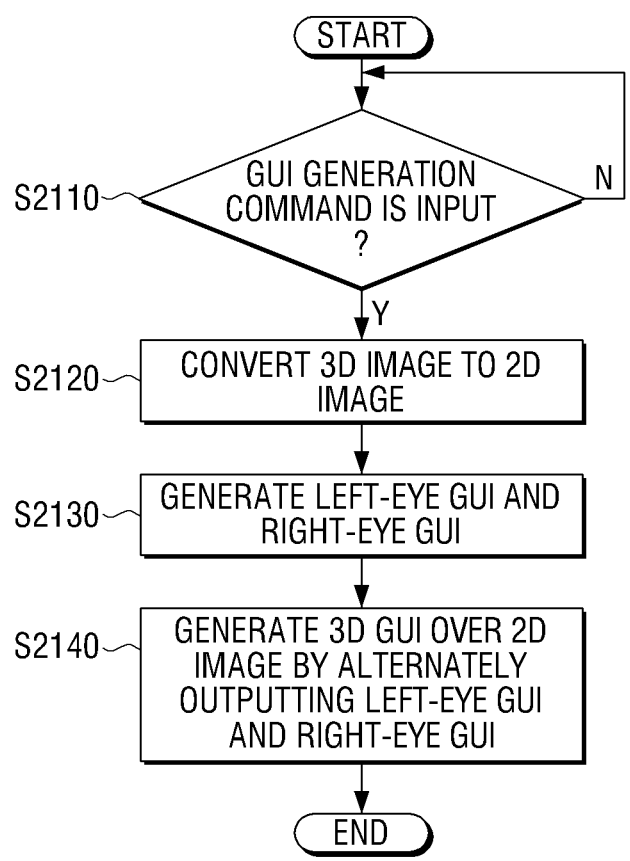
FIG. 21 is a flowchart of a 3D GUI providing method according to an exemplary embodiment.
Figure 22:
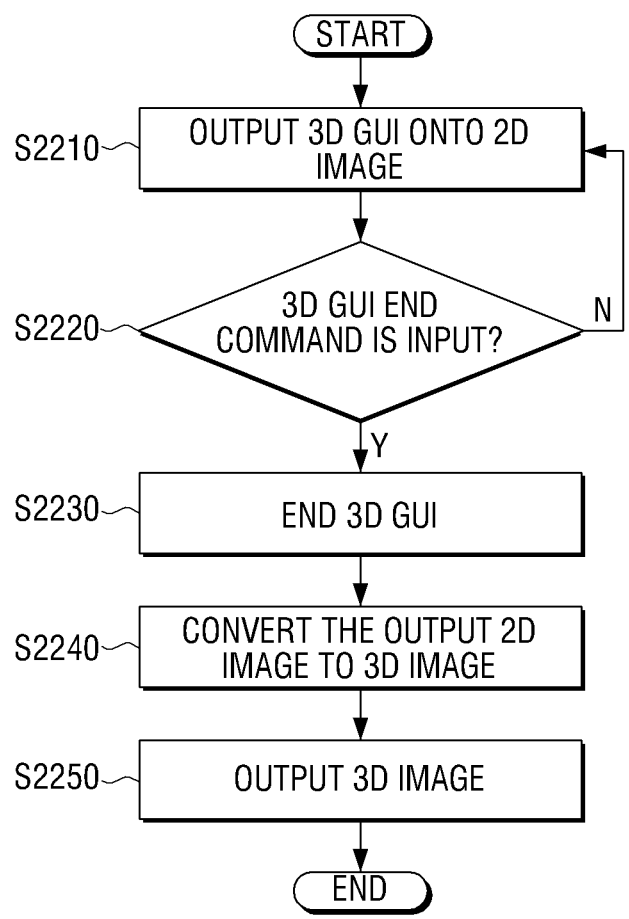
FIG. 22 is a flowchart of a 3D GUI finishing method according to an exemplary embodiment.
Figure 23:
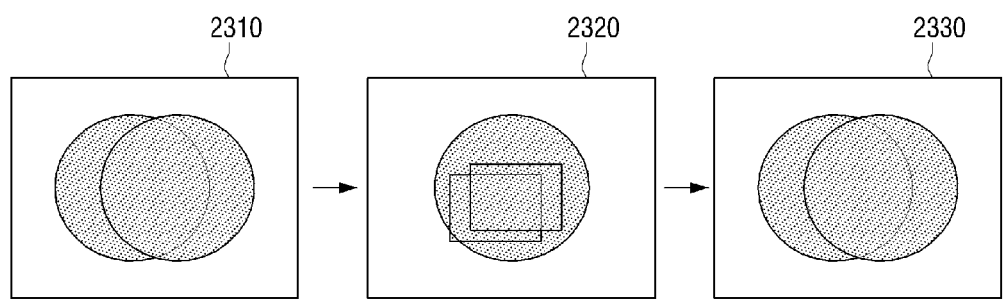
FIG. 23 is a diagram of a 3D GUI generation according to an exemplary embodiment.

Hereafter, a 3D GUI providing method of a display apparatus according to one or more exemplary embodiments is elucidated with reference to FIGS. 21, 22 and 23.

FIG. 21 is a flowchart of a GUI providing method when a 3D GUI generation command is input through a user's manipulation according to an exemplary embodiment.

Referring to FIG. 21, when the 3D GUI generation command is input to the 3D TV 2000 by the user's manipulation while a 3D image is output (S2110—Y), the 3D TV 2000 converts the output 3D image to the 2D image (S2120).

In more detail, when the 3D GUI generation command is input to the 3D TV 200 through the user's manipulation, the 3D image creator 2036 generates only one of a left-eye image and a right-eye image of the input 3D image. The 3D image creator 2036 can output only one of the generated images to the image output part 2050. Hence, the 3D image is converted to the 2D image.

Alternatively, according to another exemplary embodiment, to convert the 3D image to the 2D image, the 3D image creator 2036 can generate the left-eye image and the right-eye image of the 3D image and output only one of the generated left-eye image and the generated right-eye image to the image output part 2050. Thus, the 3D image can be converted to the 2D image.

The GUI generator 2038 generates the 3D GUI data and the 3D image creator 2036 generates the left-eye 3D GUI and the right-eye 3D GUI based on the 3D GUI data (S2130). Next, together with one output image of the 3D image, the 3D TV 2000 generates the 3D GUI by alternately outputting the generated left-eye 3D GUI and the generated right-eye 3D GUI (S2140).

As such, when the 3D GUI generation command is input and the 3D image is converted to the 2D image, discomfort due to a superimposition of the 3D GUI and the 3D image can be reduced.

FIG. 22 is a flowchart of a GUI finishing method when a 3D GUI end command is input through a user's manipulation according to an exemplary embodiment.

Referring to FIG. 22, as described above with reference to FIG. 21, when the 3D GUI is generated, the 3D image is converted to the 2D image. That is, the 3D TV 2000 outputs the 3D GUI over the 3D image (S2210). The 3D TV 200 determines whether the end command is input via the user's manipulation (S2220). When the end command is input through the user's manipulation (S2220—Y), the 3D GUI is ended (S2230). At this time, the image output 2050 does not output the 3D GUI any more.

The 3D TV 2000 converts the 2D image back to the 3D image (S2240). The 3D image creator 2036 generates a left-eye image and a right-eye image of the 3D image and alternately outputs the generated left-eye image and the generated right-eye image of the 3D image to the image output part 2036. Thus, the 3D TV 2000 can output the 3D image again (S2250).

FIG. 23 is a diagram of the 3D GUI generation according to an exemplary embodiment.

Referring to FIG. 23, the 3D image data is input to the 3D TV 2000 and the 3D image is output (2310). When a 3D GUI generation command is input through the user's manipulation, the 3D GUI is generated as described above. Furthermore, the 3D image is converted to the 2D image as shown (2320). The conversion of the 3D image to the 2D image is described above. When the 3D GUI end command is input through the user's manipulation, the 3D GUI is no longer output through the image output part 2050. Next, the 2D image is converted to the 3D image as described above (2330).

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, while not required in all aspects, one or more units of the above-described elements can include a processor or microprocessor executing a computer program stored in a computer-readable medium.

Although the exemplary embodiments have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A graphical user interface (GUI) providing method comprising:
when a setting command for a three-dimensional (3D) image is received, generating a first GUI for changing settings for the 3D image and a second GUI for changing an environment to set the 3D image; and
outputting the first GUI and the second GUI,
wherein:
when the setting command is input in an environment in which the 3D image is played, the outputting comprises outputting the first GUI and the second GUI while maintaining a playback of the 3D image; and
when the setting command is input in an environment in which the 3D image is paused, the outputting comprises outputting the first GUI and the second GUI while maintaining a pause of the 3D image,
wherein the second GUI comprises only a pause command of the 3D image while maintaining the playback of the 3D image,
wherein the second GUI comprises only a play command of the 3D image while maintaining the pause of the 3D image, and
wherein the first GUI and the second GUI are superimposed on the 3D image during the playback and during the pause of the 3D image.

2. The GUI providing method of claim 1, wherein the environment to set the 3D image is an environment in which the 3D image is played or an environment in which the 3D image is paused.

3. The GUI providing method of claim 1, wherein the settings for the 3D image comprise at least one of a setting relating to a format of the 3D image, a setting relating to conversion between an output of the 3D image and an output of a 2D image, and a setting relating to at least one of a depth control and a focus control of the 3D image.

4. The GUI providing method of claim 1, further comprising:
determining if a preset environment related to the received setting command exists; and
generating the second GUI for changing an environment to set the 3D image based on said determining,
wherein:
in response to the determining indicating that the preset environment related to the received setting command does not exist, determining current environment and generating the second GUI based on the current environment,
in response to the setting command being input in the current environment in which the 3D image is played, the outputting comprises outputting the first GUI and the second GUI superimposed on the playback of the 3D image,
in response to the setting command being input in the current environment in which the 3D image is paused, the outputting comprises outputting the first GUI and the second GUI superimposed on the paused 3D image,
the environment to set the 3D image is an environment in which the 3D image is played or an environment in which the 3D image is paused,
the environment is preset by a user to correspond to different setting commands including the setting command.

5. The GUI providing method of claim 4, wherein, the settings for the 3D image comprise a setting relating to conversion between an output of the 3D image and an output of a 2D image and the preset environment is the pause of the 3D image.

6. A non-transitory computer readable recording medium having recorded thereon a program executable by a computer for performing the method of claim 1.

7. A display apparatus comprising:
a graphical user interface (GUI) generator which, when a setting command for a three-dimensional (3D) image is received, generates a first GUI for changing settings for the 3D image and a second GUI for changing an environment to set the 3D image; and
a controller which controls to output the first GUI and the second GUI,
wherein:
when the setting command is input in an environment in which the 3D image is played, the controller controls to output the first GUI and the second GUI while maintaining a playback of the 3D image, and
when the setting command is input in an environment in which the 3D image is paused, the controller controls to output the first GUI and the second GUI while maintaining a pause of the 3D image,
wherein the second GUI comprises only a pause command of the 3D image while maintaining the playback of the 3D image,
wherein the second GUI comprises only a play command of the 3D image while maintaining the pause of the 3D image, and
wherein the first GUI and the second GUI are superimposed on the 3D image during the playback and during the pause of the 3D image.

8. The display apparatus of claim 7, wherein the environment to set the 3D image is an environment in which the 3D image is played or an environment in which the 3D image is paused.

9. The display apparatus of claim 7, wherein the settings for the 3D image comprise at least one of a setting relating to a format of the 3D image, a setting relating to conversion between an output of the 3D image and an output of a 2D image, and a setting relating to at least one of a depth control and a focus control of the 3D image.

10. A three-dimensional (3D) image providing system comprising:
a display apparatus which outputs a 3D image and, when a setting command for the 3D image is received, outputs a first graphical user interface (GUI) for changing settings for the 3D image and a second GUI for changing an environment to set the 3D image; and shutter glasses which open and close a left-eye glass and a right-eye glass based on a sync signal output from the display apparatus to input, to the left-eye glass and the right-eye glass, a left-eye image and a right-eye image, respectively, of the 3D image, wherein:
when the setting command is input in an environment in which the 3D image is played, the controller controls to output the first GUI and the second GUI while maintaining a playback of the 3D image, and when the setting command is input in an environment in which the 3D image is paused, the controller controls to output the first GUI and the second GUI while maintaining a pause of the 3D image, wherein the second GUI comprises only a pause command of the 3D image while maintaining the playback of the 3D image, wherein the second GUI comprises only a play command of the 3D image while maintaining the pause of the 3D image, and wherein the first GUI and the second GUI are superimposed on h 3D image during the playback and during the pause of the 3D image.

11. A graphical user interface (GUI) providing method for a three-dimensional (3D) image, the GUI providing method comprising:
when a command for only a focus control of the 3D image is received, displaying, with the 3D image, one GUI for the focus control and a depth control together;

when a command for only the depth control of the 3D image is received, displaying, with the 3D image, the one GUI for the focus control and the depth control together; and changing a left-eye image and a right-eye image of the 3D image according to a manipulation command input through the GUI, wherein the one GUI is a GUI which overlaps a first control bar along a first direction for adjusting the focus, and a second control bar along a second direction for adjusting the depth, the first control bar and the second control bar each comprising sliders respectively used to adjust the focus and the depth.

12. The GUI providing method of claim 11, wherein the manipulation command is received through up, down, left and right direction keys of a remote controller, through touching a screen displaying the GUI, or through pointing a screen displaying the GUI from a pointing device.

13. The GUI providing method of claim 12, wherein the up, down, left and right direction keys respectively correspond to a focus up manipulation command, a focus down manipulation command, a depth up manipulation command, and a depth down manipulation command.

14. A non-transitory computer readable recording medium having recorded thereon a program executable by a computer for performing the method of claim 11.

15. A display apparatus for displaying a three-dimensional (3D) image, the display apparatus comprising:
a graphical user interface (GUI) generator which, when a command for only a focus control of the 3D image is received, generates one GUI for the focus control and a depth control, and when a command for only the depth control of the 3D image is received, generates the one GUI for the focus control and the depth control;

a display which displays the 3D image together with the GUI; and a controller which controls to change a left-eye image and a right-eye image of the 3D image according to a manipulation command input through the GUI, wherein the one GUI is a GUI which overlaps a first control bar along a first direction for adjusting the focus, and a second control bar along a second direction for adjusting the depth, the first control bar and the second control bar each comprising sliders respectively used to adjust the focus and the depth.

16. The display apparatus of claim 15, further comprising:
a user command receiver which receives the manipulation command, wherein the manipulation command is received through up, down, left and right direction keys of a remote controller, through touching a screen displaying the GUI, or through pointing a screen displaying the GUI from a pointing device.

17. The display apparatus of claim 16, wherein the up, down, left and right direction keys respectively correspond to a focus up manipulation command, a focus down manipulation command, a depth up manipulation command, and a depth down manipulation command respectively.

18. A three-dimensional (3D) image providing system comprising:
a display apparatus which, when an input of a command for only a focus control is received, displays one graphical user interface (GUI) for both the focus control and the depth control, when an input of a command for only a depth control of the 3D image is received, displays the one graphical user interface for both the focus control and the depth control, and which modifies and outputs a left-eye image and a right-eye image of the 3D image according to a manipulation command input through the GUI; and shutter glasses which open and close a left-eye glass and a right-eye glass based on a sync signal output from the display apparatus to input, to the left-eye glass and the right-eye glass, the modified left-eye image and the modified right-eye image, respectively, wherein the one GUI is a GUI which overlaps a first control bar along a first direction for adjusting the focus, and a second control bar along a second direction for adjusting the depth, the first control bar and the second control bar each comprising sliders respectively used to adjust the focus and the depth.

19. A graphical user interface (GUI) providing method comprising:
displaying a GUI for setting an element which is used to adjust a stereoscopic effect of a three-dimensional (3D) image by adjusting both a depth of the 3D image and a focus of the 3D image based on a selection of one setting from among at least three settings of the element; and modifying a left-eye image and a right-eye image of the 3D image to adjust the stereoscopic effect of the 3D image according to the element set through the GUI, wherein the modifying comprises: in response to one setting of the three settings being selected, adjusting the depth of the 3D image and the focus of the 3D image simultaneously to correspond to the selected setting.

20. The GUI providing method of claim 19, further comprising:
providing a preview of the 3D image with the adjusted stereoscopic effect according to the element set through the GUI, wherein the displayed GUI of the element comprises a control for adjusting the depth and a control for adjusting the focus, which are configured to be manipulated separately by a user.

21. A non-transitory computer readable recording medium having recorded thereon a program executable by a computer for performing the method of claim 19.

22. A display apparatus comprising:
a graphical user interface (GUI) generator which generates a GUI to set an element used to adjust a stereoscopic effect of a three-dimensional (3D) image by adjusting both a depth of the 3D image and a focus of the 3D image based on a selection of one setting from among at least three settings of the element; and
a controller which controls to modify a left-eye image and a right-eye image of the 3D image to adjust the stereoscopic effect of the 3D image according to the element set through the GUI,
wherein in response to one setting of the three settings being selected, the controller is further configured to adjust the depth of the 3D image and the focus of the 3D image simultaneously to correspond to the selected setting.

23. The display apparatus of claim 22, wherein the controller controls to provide a preview of the 3D image with the adjusted stereoscopic effect according to the element set through the GUI.

24. A display apparatus comprising:
a manipulator which receives a manipulation of a user;
an image input part which inputs a three-dimensional (3D) image;
a 3D image creator which generates a left-eye image and a right-eye image corresponding to the input 3D image;
an image output part which outputs the generated left-eye image and the generated right-eye image; and
a controller which, when an input, through the manipulator, of a generation command of a 3D graphical user interface (GUI) to display over the 3D image is received, controls to output only one of the generated left-eye image and the generated right-eye image and to output the GUI,
wherein the 3D GUI comprises a first GUI for changing settings for the 3D image and a second GUI for changing an environment to set the 3D image,
wherein:
when a setting command is input in an environment in which the 3D image is played, the controller controls to output the first GUI and the second GUI while maintaining a playback of the 3D image, and
when the setting command is input in an environment in which the 3D image is paused, the controller controls to output the first GUI and the second GUI while maintaining a pause of the 3D image,
wherein the second GUI comprises only a pause command of the 3D image while maintaining the playback of the 3D image,
wherein the second GUI comprises only a play command of the 3D image while maintaining the pause of the 3D image, and
wherein the first GUI and the second GUI are superimposed on the 3D image during the playback and during the pause of the 3D) image.

25. The display apparatus of claim 24, further comprising:
a GUI generator which generates the 3D GUI,
wherein the 3D image creator generates a left-eye GUI and a right-eye GUI corresponding to the generated 3D GUI, and the controller controls to alternately output the left-eye GUI and the right-eye GUI together with one of the left-eye image and the right-eye image.

26. The display apparatus of claim 25, wherein, when an input, through the manipulator, of an end command of the 3D GUI, the controller controls to stop outputting the 3D GUI and to alternately output the generated left-eye image and the generated right-eye image corresponding to the input 3D image.

27. The display apparatus of claim 24, wherein:
when the input of the generation command of the 3D GUI to display over the 3D image is received, the 3D image creator generates only one of the left-eye image and the right-eye image; and
the controller controls to output of the only one of the generated left-eye image and the generated right-eye image.

28. A graphical user interface (GUI) providing method comprising:
receiving a manipulation of a user;
inputting a three-dimensional (3D) image;
generating a left-eye image and a right-eye image corresponding to the input 3D image;
outputting the generated left-eye image and the generated right-eye image; and
when an input of a generation command of a 3D GUI to display over the 3D image through the received manipulation is received, outputting the 3D GUI together with one of the generated left-eye image and the generated right-eye image,
wherein the 3D GUI comprises a first GUI for changing settings for the 3D image and a second GUI for changing an environment to set the 3D image,
wherein:
when a setting command is input in an environment in which the 3D image is played, the outputting comprises outputting the first GUI and the second GUI while maintaining a playback of the 3D image, and
when the setting command is input in an environment in which the 3D image is paused, the outputting comprises outputting the first GUI and the second GUI while maintaining a pause of the 3D image,
wherein the second GUI comprises only a pause command of the 3D image while maintaining the playback of the 3D image,
wherein the second GUI comprises only a play command of the 3D image while maintaining the pause of the 3D image, and
wherein the first GUI and the second GUI are superimposed on the 3D image during the playback and during the pause of the 3D image.

29. The GUI providing method of claim 28, further comprising:
generating the 3D GUI;
generating a left-eye GUI and a right-eye GUI corresponding to the generated 3D GUI; and
alternately outputting the left-eye GUI and the right-eye GUI together with one of the left-eye image and the right-eye image.

30. The GUI providing method of claim 29, further comprising:
receiving an end command of the 3D GUI through the received manipulation; and
stopping the outputting of the 3D GUI and alternately outputting the generated left-eye image and the generated right-eye image corresponding to the input 3D image.

31. The GUI providing method of claim 28, wherein the generating of the left-eye image and the right-eye image corresponding to the input 3D image generates only one of the left-eye image and the right-eye image when the generation command of the 3D GUI to display over the 3D image is input through the received manipulation, and the outputting of only one of the left-eye image and the right-eye image outputs one of the generated left-eye image and the generated right-eye image.

32. A non-transitory computer readable recording medium having recorded thereon a program executable by a computer for performing the method of claim 28.

* * * * *